United States Patent
Buckley et al.

(10) Patent No.: US 8,160,559 B2
(45) Date of Patent: *Apr. 17, 2012

(54) SYSTEM AND METHOD FOR MANAGING MOBILE-TERMINATED (MT) CALLS IN IMS NETWORK ENVIRONMENT USING ALTERNATIVE SIGNALING

(75) Inventors: Adrian Buckley, Tracy, CA (US); Jan John-Luc Bakker, Keller, TX (US)

(73) Assignee: Research In Motion Limited, Waterloo (CA)

( * ) Notice: Subject to any disclaimer, the term of this patent is extended or adjusted under 35 U.S.C. 154(b) by 453 days.

This patent is subject to a terminal disclaimer.

(21) Appl. No.: 12/126,974

(22) Filed: May 26, 2008

(65) Prior Publication Data

US 2008/0299958 A1 Dec. 4, 2008

Related U.S. Application Data

(60) Provisional application No. 60/941,322, filed on Jun. 1, 2007, provisional application No. 60/942,949, filed on Jun. 8, 2007, provisional application No. 60/943,115, filed on Jun. 11, 2007.

(51) Int. Cl.
*H04M 3/42* (2006.01)
(52) U.S. Cl. ......... 455/417; 455/455; 455/466; 370/352
(58) Field of Classification Search ............... 455/455, 455/466; 370/352
See application file for complete search history.

(56) References Cited

U.S. PATENT DOCUMENTS

| | | | |
|---|---|---|---|
| 7,236,800 B2 | 6/2007 | Kim | |
| 7,668,159 B2 * | 2/2010 | Buckley et al. | 370/354 |
| 7,710,950 B2 * | 5/2010 | Buckley et al. | 370/354 |
| 7,720,489 B2 | 5/2010 | Engelhart, Sr. | |
| 7,760,712 B2 * | 7/2010 | Buckley | 370/353 |
| 7,769,000 B2 * | 8/2010 | Buckley | 370/353 |
| 7,830,868 B2 * | 11/2010 | Buckley | 370/353 |

(Continued)

FOREIGN PATENT DOCUMENTS

EP 1806899 A1 * 7/2007

(Continued)

OTHER PUBLICATIONS

The International Preliminary Report on Patentability; Application No. PCT/US2008/064822; International Preliminary Examining Authority; Jun. 23, 2009; 6 pages.

(Continued)

*Primary Examiner* — Charles Shedrick
(74) *Attorney, Agent, or Firm* — The Danamraj Law Group, P.C.

(57) ABSTRACT

In one embodiment, a scheme is disclosed for managing delivery of a Mobile-Terminated (MT) call via an IMS network, wherein the MT call is originated by a calling party towards a User Equipment (UE) device that is CS-attached. An IMS-capable network node is operable to associate the received call information with an IP Multimedia Routing Number (IMRN) and provide the call information and the IMRN via alternative signaling (e.g., USSD or SMS messaging) to the UE device. A Mobile-Originated (MO) call process is initiated by the UE device using the received IMRN as the destination number, which terminates at the network node. Upon verifying that the returned IMRN is valid, the network node bridges the access and remote legs to establish the end-to-end path for the MT call between the UE device and the calling party.

25 Claims, 15 Drawing Sheets

U.S. PATENT DOCUMENTS

| | | | |
|---|---|---|---|
| 7,953,423 B2 | 5/2011 | Gallagher et al. | |
| 2004/0030906 A1 | 2/2004 | Marmigere et al. | |
| 2005/0058125 A1* | 3/2005 | Mutikainen et al. | 370/354 |
| 2006/0280169 A1* | 12/2006 | Mahdi | 370/352 |
| 2007/0049281 A1* | 3/2007 | Chen et al. | 455/445 |
| 2007/0165612 A1* | 7/2007 | Buckley | 370/356 |
| 2007/0201441 A1* | 8/2007 | Buckley | 370/356 |
| 2007/0274289 A1* | 11/2007 | Buckley et al. | 370/351 |
| 2008/0080480 A1* | 4/2008 | Buckley et al. | 370/352 |
| 2008/0123625 A1* | 5/2008 | Buckley | 370/352 |
| 2008/0299958 A1* | 12/2008 | Buckley et al. | 455/417 |
| 2008/0299980 A1* | 12/2008 | Buckley et al. | 455/445 |
| 2010/0177771 A1* | 7/2010 | Buckley et al. | 370/352 |
| 2010/0246780 A1* | 9/2010 | Bakker et al. | 379/38 |
| 2010/0272088 A1* | 10/2010 | Buckley | 370/338 |

FOREIGN PATENT DOCUMENTS

| | | |
|---|---|---|
| WO | 2008150749 | 12/2008 |
| WO | 2008150750 | 12/2008 |

OTHER PUBLICATIONS

The International Preliminary Report on Patentability; Application No. PCT/US2008/064823; International Preliminary Examining Authority; May 7, 2009; 7 pages.

EPO Communication Examination Report, Application No. 08756273.2, dated Sep. 8, 2010, 4 pgs.

EPO Communication Examination Report, Application No. 08769728.0, dated Sep. 13, 2010, 4 pgs.

PCT International Search Report and Written Opinion Application No. PCT/US2008/064822; International Searching Authority; Oct. 22, 2008; 13 Pages.

PCT International Search Report and Written Opinion Application No. PCT/US2008/064823; International Searching Authority; Oct. 22, 2008; 12 Pages.

3PP TR23.892 "3rd Generation Partnership Project; Technical Specification Group Services and System Aspects; IP Multimedia System (IMS) Centralized Services (Release 8)"; Global System for Mobile Communications ; May 2007; 71 Pages.

3PP TS23.206 "3rd Generation Partnership Project; Technical Specification Group Services and System Aspects; Voice Call Continuity (VCC) between Circuit Switched (CS) and IP Multimedia System (IMS); Stage 2 (Release 7)"; Global System for Mobile Communications ; Dec. 2006; 35 Pages.

Liebhart, et al, "Interworking between the IMS Messaging Service and SMS or MMS", IP.Com Electronic Publication, Sep. 13, 2006, 4 pgs.

IP Australia, Examiner's Second Report, Application No. 2008260205, Oct. 12, 2011, 2 pgs.

IP Australia, Notice of Allowance, Application No. 2008260205, Nov. 3, 2011, 1 pg.

EPO, Communication Pursuant to Article 94(3) EPC, Application No. 08756272.4, Mar. 28, 2011, 4 pgs.

IP Australia, Examiner's First Report, Application No. 2008260205, Apr. 11, 2011, 2 pgs.

KIPO, Office Action, Application No. 10-2009-7026920, Apr. 20, 2011, 7 pgs.

KIPO, Office Action, Application No. 10-2009-7026921, Apr. 20, 2011, 4 pgs.

USPTO Office Action, U.S. Appl. No. 12/126,977, May 11, 2011, 9 pgs.

EPO, Communication Pursuant to Article 94(3) EPC, Application No. 08756272.4, Sep. 7, 2010, 4 pgs.

IP Australia, 1st Examiner's Report, Application No. 2008260204, Aug. 15, 2011, 2 pgs.

ISA/IPO, Search Report and Written Opinion, Application No. PCT/US2008/064824, Dec. 1, 2009, 10 pgs.

ISA/IPO, The International Preliminary Report on Patentability; Application No. PCT/US2008/064824, Dec. 10, 2009, 7 pgs.

USPTO, Office Action, U.S. Appl. No. 12/126,977, Dec. 3, 2010, 11 pgs.

Vivek Bhargava Cisco Systems et al, Draft Study Period 2001-2004 H.225.0 V. 5 Draft, TD 14, May 20, 2003, 194 pgs.

JPO, Notice of Reasons for Rejection, Application No. 2010-510445, Nov. 22, 2011, 3 pgs.

JPO, Notice of Reasons for Rejection, Application No. 2010-510446, Nov. 22, 2011, 3 pgs.

KIPO, Notice of Decision for Patent, Application No. 10-2009-7026921, Dec. 15, 2011, 3 pgs.

IP Australia, Notice of Acceptance, Application No. 2008260204, Jan. 6, 2012, 3 pgs.

KIPO, Notice of Decision for Patent, Application No. 10-2009-7026920, Dec. 15, 2011, 3 pgs.

USPTO, Corrected Notice of Allowance, U.S. Appl. No. 12/126,977, Jan. 10, 2012, 2 pgs.

USPTO, Office Action, U.S. Appl. No. 12/126,979, Dec. 22, 2011, 14 pgs.

* cited by examiner

SYSTEM AND METHOD FOR MANAGING MOBILE-TERMINATED (MT) CALLS IN IMS NETWORK ENVIRONMENT USING ALTERNATIVE SIGNALING

PRIORITY UNDER 35 U.S.C. §119(e) & 37 C.F.R. §1.78

This nonprovisional patent application claims priority based upon the following prior U.S. provisional patent application(s): (i) "SYSTEM AND METHODS FOR MANAGING MT CALL USING ALTERNATIVE SIGNALLING," Application No. 60/941,322, filed Jun. 1, 2007, in the name(s) of Adrian Buckley and Jan John-Luc Bakker; (ii) "SYSTEM AND METHODS FOR MANAGING MT CALL USING ALTERNATIVE SIGNALLING," Application No. 60/942,949, filed Jun. 8, 2007, in the name(s) of Adrian Buckley and Jan John-Luc Bakker; and (iii) "SYSTEM AND METHODS FOR MANAGING MT CALL USING ALTERNATIVE SIGNALLING," Application No. 60/943,115, filed Jun. 11, 2007, in the name(s) of Adrian Buckley and Jan John-Luc Bakker, which is (are) hereby incorporated by reference.

REFERENCE TO RELATED APPLICATION(S)

This application discloses subject matter that is related to the subject matter of the following U.S. patent application(s): (i) "SYSTEM AND METHOD FOR MANAGING MOBILE-TERMINATED (MT) CALLS IN IMS NETWORK ENVIRONMENT USING ALTERNATIVE SIGNALING", application Ser. No. 12/126,977, filed even date herewith, in the name(s) of Adrian Buckley and Jan John-Luc Bakker; and (ii) "MESSAGE GENERATION SYSTEM AND METHOD FOR MANAGING IMS SIGNALING OVER A CIRCUIT-SWITCHED NETWORK", application Ser. No. 12/126,979, filed even date herewith, in the name(s) of Adrian Buckley and Jan John-Luc Bakker, which is (are) hereby incorporated by reference.

This application further discloses subject matter that is related to the subject matter of the following U.S. patent application(s): (i) application Ser. No. 11/328,875, filed on Jan. 10, 2006; (ii) application Ser. No. 11/347,874, filed on Feb. 6, 2006; (iii) application Ser. No. 11/503,465, filed on Aug. 11, 2006; and (iv) application Ser. No. 11/542,462, filed on Oct. 3, 2006.

FIELD OF THE DISCLOSURE

The present patent disclosure generally relates to call processing in communications networks. More particularly, and not by way of any limitation, the present patent disclosure is directed to a system and method for managing a Mobile-Terminated (MT) call in a network environment including a Circuit-Switched (CS) network and an IP Multimedia Subsystem (IMS) network.

BACKGROUND

Operators may offer services hosted on or through an IMS network to CS-attached devices, which allows for certain IMS-based services (including supplementary services) to be consumed by such devices. Whereas delivery of an MT call originated by a calling party towards a CS-attached device is being contemplated as one of the IMS-based services, various problems arise with respect to managing such an MT call, especially where multiple MT calls may be involved.

BRIEF DESCRIPTION OF THE DRAWINGS

A more complete understanding of the embodiments of the present patent disclosure may be had by reference to the following Detailed Description when taken in conjunction with the accompanying drawings wherein.

DETAILED DESCRIPTION OF THE DRAWINGS

Figure 1:
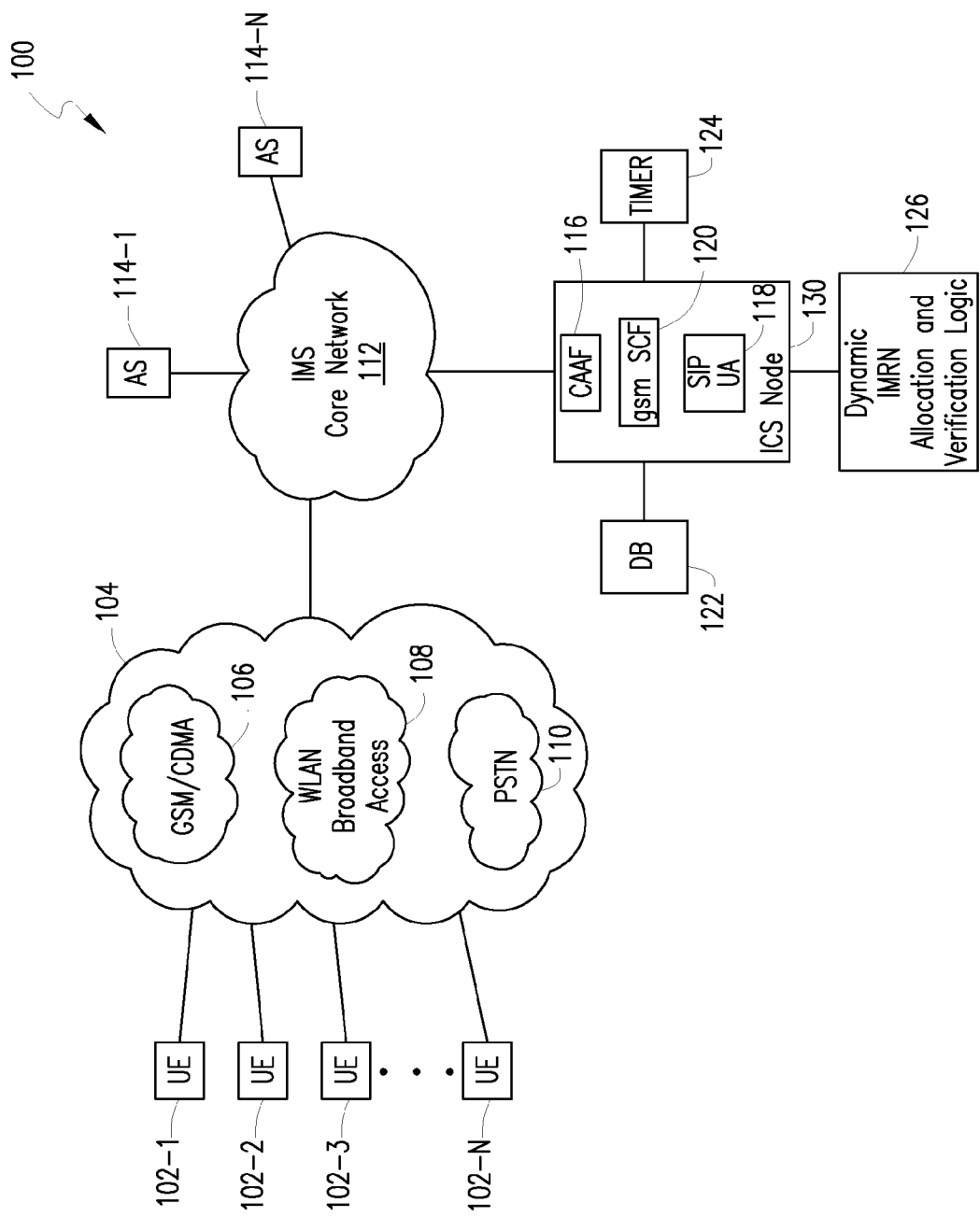
FIG. 1 depicts a network environment including Circuit-Switched (CS) network infrastructure and IP Multimedia Subsystem (IMS) infrastructure wherein an embodiment of the present patent disclosure may be practiced.

The present patent disclosure is broadly directed to a scheme for managing delivery of an MT call to a CS-attached UE device via an IMS Centralized Services (ICS) capable functionality. In one aspect, an embodiment is directed to a method of managing an MT call in an IMS network, the MT call being originated by a calling party towards a UE device. The claimed embodiment comprises one or more of the following: receiving a message pursuant to the MT call at a network node and determining that the MT call is to be delivered to the UE device over a CS domain; storing call information relating to the MT call and associating an IP Multimedia Routing Number (IMRN) with at least a portion of the call information in a mapping relationship; transmitting one or more alternative signaling (AS) messages to the UE device, wherein at least one of the AS messages includes the IMRN and an indication that the AS message is for delivery of the MT call; receiving the IMRN back from the UE device pursuant to a Mobile-Originated (MO) call terminating at the network node, wherein the IMRN is used as a destination number; and upon verifying that the IMRN is valid, initiating an access leg with the UE device and bridging the access leg with a remote leg associated with the calling party for establishing an end-to-end path for the MT call between the calling party and the UE device.

Another embodiment of the present patent disclosure is directed to a network node operable to manage an MT call being originated by a calling party in an IMS environment towards a UE device. The claimed embodiment comprises one or more of the following: a component configured to receive a message pursuant to the MT call and for determining that the MT call is to be delivered to the UE device over a CS domain; a component configured to store call information relating to the MT call and for associating an IMRN with at least a portion of the call information in a mapping relationship; a component configured to transmit one or more alternative signaling (AS) messages to the UE device, wherein at least one of the AS messages includes the IMRN and an indication that the AS message is for delivery of the MT call; a component configured to receive the IMRN back from the UE device pursuant to a Mobile-Originated (MO) call terminating at the network node, wherein the IMRN is used as a destination number; and a component, operable responsive to verifying that the IMRN is valid, configured to initiate an access leg with the UE device and to bridge the access leg with a remote leg associated with the calling party for establishing an end-to-end path for the MT call between the calling party and the UE device.

In a further embodiment, disclosed herein is a computer-accessible medium having a sequence of instructions executable by a processing entity of a network node operable to manage an MT call that is originated by a calling party in an IMS environment towards a UE device. The claimed embodiment comprises one or more of the following: instructions for storing call information relating to the MT call received via a message pursuant to the MT call and for determining that the MT call is to be delivered to the UE device over a CS domain; instructions for associating an IMRN with at least a portion of the call information in a mapping relationship; instructions for encoding one or more alternative signaling (AS) messages for transmission to the UE device, wherein at least one of the AS messages includes the IMRN and an indication that the AS message is for delivery of the MT call; instructions for verifying that the IMRN is valid when the IMRN is received back from the UE device pursuant to an MO call wherein the IMRN is used as a destination number; and instructions for bridging an access leg associated with the UE device and a remote leg associated with the calling party for establishing an end-to-end path for the MT call between the calling party and the UE device.

A system and method of the present patent disclosure will now be described with reference to various examples of how the embodiments can best be made and used. Like reference numerals are used throughout the description and several views of the drawings to indicate like or corresponding parts, wherein the various elements are not necessarily drawn to scale. Referring now to the drawings, and more particularly to FIG. 1, an exemplary network environment 100 is depicted wherein an embodiment of the present patent disclosure may be practiced for managing the delivery of an MT call to a UE device that is CS-attached for some reason. As depicted, the network environment 100 includes an access space 104 comprised of a number of access technologies available to one or more UE devices 102-1 through 102-N, of which a particular UE device may be a CS-attached device that is operable to consume one or more IMS Centralized Services (ICS). For purposes of the present disclosure, a UE device may be any tethered or untethered communications device, and may include any personal computer (e.g., desktops, laptops, palm-tops, or handheld computing devices) equipped with a suitable wireless modem or a mobile communications device (e.g., cellular phones or data-enabled handheld devices capable of receiving and sending messages, web browsing, et cetera), or any enhanced PDA device or integrated information appliance capable of email, video mail, Internet access, corporate data access, messaging, calendaring and scheduling, information management, and the like. In general, a UE device may be capable of operating in multiple modes in that it can engage in both Circuit-Switched (CS) as well as Packet-Switched (PS) communications, and can transition from one mode of communications to another mode of communications without loss of continuity. Furthermore, those skilled in the art will recognize that a wireless UE device may sometimes be treated as a combination of a separate mobile equipment (ME) device and an associated removable memory module. Accordingly, for purposes of the present disclosure, the terms "wireless device" and "UE device", which are broadly synonymous, are each treated as representative of both ME devices alone as well as the combinations of ME devices with removable memory modules as applicable.

The access space 104 may be comprised of both CS and PS network domains, which may involve wireless technologies, wireline technologies, broadband access technologies, etc. For example, reference numeral 106 refers to wireless technologies such as Global System for Mobile Communications (GSM) networks and Code Division Multiple Access (CDMA) networks, although it is envisaged that the teachings hereof may be extended to any $3^{rd}$ Generation Partnership Project (3GPP)-compliant cellular network (e.g., 3GPP or 3GPP2) as well. Reference numeral 108 refers to broadband access networks including wireless local area networks or WLANs, Wi-MAX networks as well as fixed networks such as DSEL, cable broadband, etc. Thus, for purposes of the present disclosure, the access technologies may comprise radio access technologies selected from IEEE 802.11a technology, IEEE 802.11b technology, IEEE 802.11g technology, IEEE 802.11n technology, GSM/EDGE Radio Access Network (GERAN) technology (both CS and PS domains), and Universal Mobile Telecommunications System (UMTS) technology, and Evolution—Data Optimized (EVDO) technology, and so on. Additionally, also exemplified as part of the access space 104 is the conventional wireline PSTN infrastructure 110 illustrated in FIG. 1. It should be realized that regardless of the access network technologies or communication modes, an ICS-capable UE device that is CS-attached may simply be referred to as an ICS UE device for purposes of the present disclosure.

An IMS core network 112 may be coupled to one or more of the various access networks set forth above, including any CS-based networks. As is well known, the IMS standard defined by the 3GPP body is designed to allow service providers manage a variety of services that can be delivered via IP over any network type, wherein IP is used to transport both bearer traffic and Session Initiation Protocol (SIP)-based signaling traffic. Broadly, IMS is a framework for managing the applications (i.e., services) and networks (i.e., access) that is capable of providing multimedia services. IMS defines an "application server" as a network element that delivers services subscribers use, e.g., voice call continuity (VCC), Push-To-Talk (PTT), etc. IMS manages applications by defining common control components that each application server (AS) is required to have, e.g., subscriber profiles, IMS mobility, network access, authentication, service authorization, charging and billing, inter-operator functions, and interoperation with the legacy phone network.

It should be understood that whereas IMS is defined by the 3GPP standards body that mainly addresses GSM networks, another group, 3GPP2, is involved in defining a closely analogous architecture referred to as Multimedia Domain (MMD). MMD is basically an IMS for CDMA networks, and since MMD and IMS are roughly equivalent, the term "IMS" may be used in this present patent disclosure to refer collectively to both IMS and MMD where applicable. In addition, fixed network standards for NGN (Next Generation Networks) that are based on and/or reuse IMS are also being developed by bodies such as ETSI TISPAN, Cablelabs and the ITU-T. NGN and IMS are roughly equivalent, and accordingly the term "IMS" may also be used in this present patent disclosure to refer collectively to both IMS and NGN where applicable.

Continuing to refer to FIG. 1, reference numerals 114-1 to 114-N refer to a plurality of AS nodes operable to support various services, e.g., VCC, PTT, etc., as alluded to hereinabove. In addition, another network element 130, broadly defined as an "ICS network function" or "ICS node" for purposes of the present disclosure, is associated with the IMS network 112 for effectuating the functionality with respect to managing an MT call originated by a calling party (not shown) towards an ICS UE device. In one arrangement, the ICS network node 130 may be embodied as an IMS CS Control Function (ICCF) that may be associated with the ICS UE device's home IMS core network. Functionalities such as call continuity control function (CCCF) and network domain selection (NeDS) may also be associated therewith. In general, the CCCF is operable as a new IMS application server element that resides in the home IMS network and tracks all call sessions and related mobile voice-over-IP (VoIP) bearer traffic, including call handover/routing between CS and IMS domains. The NeDS portion is responsible for performing, inter alia, registration/de-registration management between the IMS and CS networks (e.g., GSM, CDMA, etc.). Despite being potentially separate functions, it is possible to integrate both the CCCF and NeDS functionalities into a single IMS-compatible network element (not explicitly shown in FIG. 1). For purposes of managing MT call delivery, however, the ICS network function 130 includes a CS Access Adaptation Function (CAAF) 116 as well as a SIP User Agent (UA) 118. Also, a suitable session control function (SCF) 120 may be provided as part of the ICS node 130 with respect to applicable radio access technology, e.g., gsmSCF. Additional IMS functionalities such as the following may also be operably associated with the ICS node 130 in some form: Domain Transfer Function (DTF) (also referred to as Functional Entity FE-A), CS Adaptation Function (CSAF) (also referred to as FE-B), CAMEL Service (also referred to as FE-C), and Domain Selection Function (DSF) (also referred to as FE-D). Accordingly, for purposes of the present disclosure, the term "network node" with reference to an IMS core network may comprise one or more of the foregoing functionalities in addition to the ICS functionality, in any suitable architecture, implementation, integration, or the like, as well as additional service logic described in detail hereinbelow.

Furthermore, although not shown in FIG. 1, a master user database, referred to as a Home Subscriber Server or HSS, may be provided as part of the home IMS network 112, for supporting the various IMS network entities that actually manage calls or sessions such as the ICS node 130. In general, the HSS database may contain user profiles (i.e., subscription-related information), including various user and device identifies such as International Mobile Subscriber Identity (IMSI), Temporal Mobile Subscriber Identity (TMSI), International Mobile Equipment Identity (IMEI), Mobile Subscriber ISDN Number (MSISDN), Universally Unique Identifier (UUID), as well as additional IMS-specific identities such as IM Multimedia Private Identity (IMPI) and IP Multimedia Public Identity (IMPU) that are implemented as Tel-Uniform Resource Identifiers (URIs) or SIP-URIs. Whereas the IMPI is unique to a particular user in a 3GPP system (i.e., (I) SIM) or could be unique to a particular UE device in another technology, it is possible to have multiple Public Identities (i.e., IMPUs) per IMPI. Further, the IMPU can also be shared with IMPI such that two or more devices can be reached with the same identity (e.g., a single phone number for an entire family).

Additionally, appropriate database structures (e.g., DB 122), timer mechanisms (e.g., timer 124) and suitable logic 126 may be provided in association with the ICS node 130 for purposes of configuring and managing a pool of IP Multimedia Routing Numbers (IMRNs) from which a select IMRN may be dynamically allocated for purposes of managing the delivery of an MT call to an ICS UE device, as will be set forth in detail below.

Figure 2:
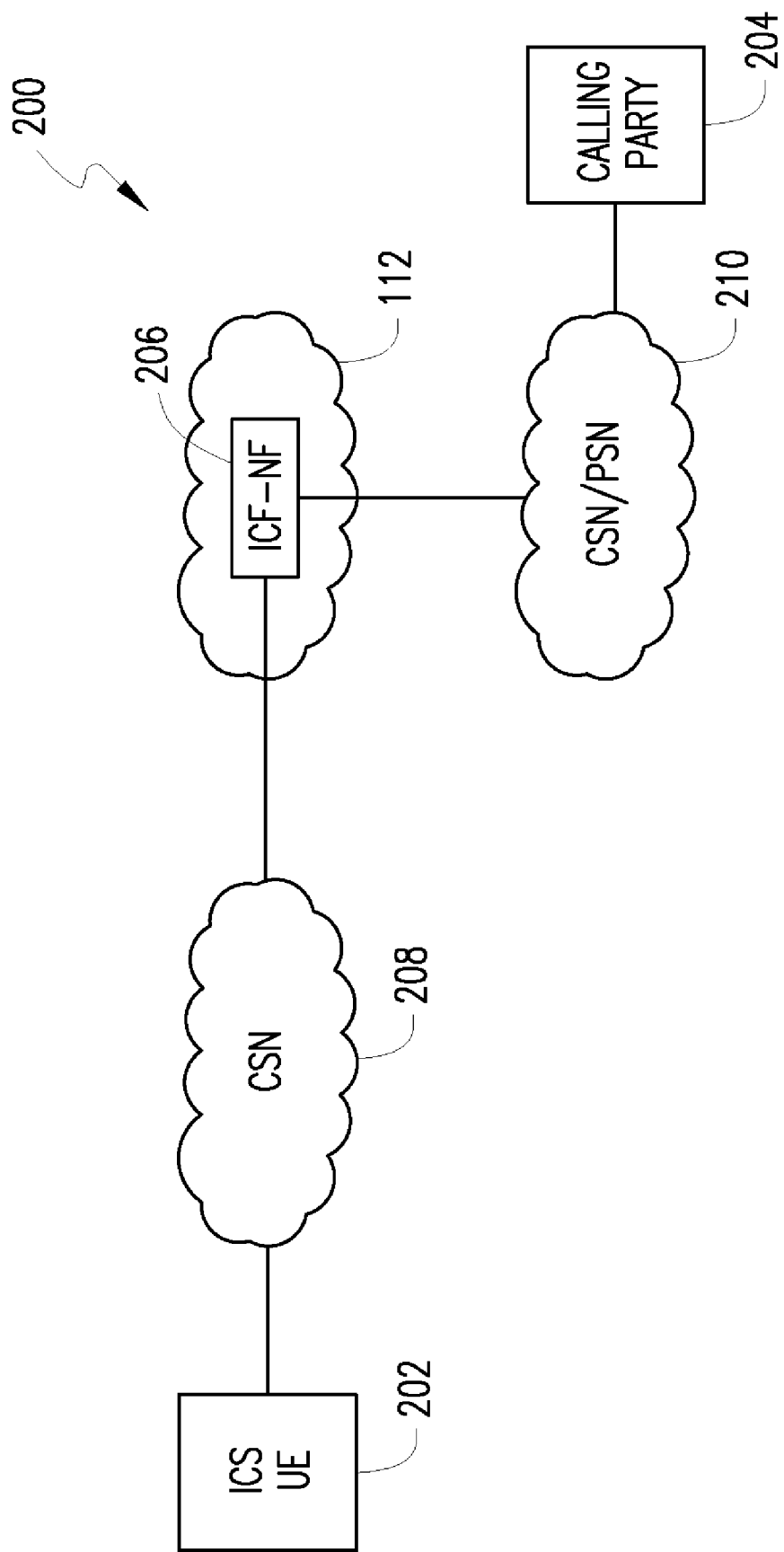
FIG. 2 depicts a simplified network arrangement wherein a Mobile-Terminated (MT) call is delivered through an IMS network node according to one embodiment.

FIG. 2 depicts a simplified network arrangement 200 that is an analogous view of the network environment 100 described above, wherein an MT call originated by a calling party 204 is delivered through an IMS network node according to one embodiment. An ICS UE 202 is exemplary of the various UE devices described in the foregoing sections with respect to FIG. 1, wherein ICS UE 202 is attached to a CS network (CSN) 208 for any number of reasons. For purposes of the present disclosure, an embodiment of the ICS UE device 202 is a UE device that is capable of receiving telephony and other services offered by the IMS core while the voice bearer is established via a CSN. It may be realized that a UE device may be CS-attached in spite of the capability of the UE device (e.g., a mobile communications device or MCD) to be able to regularly communicate pursuant to both CS and PS communications. Hence, such a device might not be able to receive, or otherwise communicate, pursuant to a PS-based service. In some instances, the UE device may, in fact, not be PS-capable. Or, the subscription pursuant to which the UE device operates may not permit receiving a PS-based service. Or, even if the UE device is PS-capable, a serving PS network (PSN) might not support the particular media (e.g., speech) that is to be communicated pursuant to the communication service. Additionally, even if the UE device is PS-capable, the user's preference might be to utilize CS network connections, e.g., the user may prefer not to connect to an available PSN when the user is roaming. Or, operator, or other, policy might prohibit PS-based access to the UE device.

Irrespective of the reason(s) as to why the ICS UE device 202 is CS-attached, it is desirous of consuming an IMS-based service such as, e.g., an ICS service, that is mediated over the IMS network 112. An ICS network function (ICS-NF) 206 is exemplary of the ICS node 130 shown in FIG. 1 that may embody the functionality of an ICCF element operable to effectuate an ICS service, which in the exemplary embodiment is the delivery of an MT-call originated by the calling party 204. A suitable network 210 is operably disposed between the calling party 204 and the IMS network 112 for effectuating a remote leg connection with respect to the MT call service.

As set forth previously, the ICS network node 206 includes appropriate logic to generate and manage a pool of dynamically allocable IMRNs for purposes of effectuating MT call delivery to ICS UE devices. In addition, the ICS network node 206 is operable with a suitable alternative signaling message application such as an Unstructured Supplementary Service Data (USSD) messaging application or a Short Messaging Service (SMS) application that may be used for transporting an assigned IMRN to the called party, i.e., ICS UE device 202, via a CS domain. In one embodiment, the alternative messaging application may be co-located with the ICS node 206. In another embodiment, the functionality of the alternative messaging application may be embodied as a separate entity operably associated with the ICS node 206. Accordingly, a network node for purposes of the present disclosure may also include an enhanced MSC or an ICS-capable MSC having the foregoing functionalities.

Additionally, a Back-to-Back User Agent (B2BUA) functionality may also be provided in conjunction with the ICS node 206 for setting up and bridging appropriate remote and access legs of an MT call. In general, if it is determined that an incoming call via a remote leg from a calling party such as the party 204 is an MT call to be delivered to the ICS UE 202 that is attached to the CS domain, appropriate logic associated with the ICS node 206 is operable to effectuate a specialized call treatment process that allows establishment of an access leg to the ICS UE 202. Upon receiving suitable signaling messages with respect to the incoming MT call on the remote leg, the ICS node 206 stores relevant call parameters and dynamically allocates a routable number such as an IMRN (and other related information) that may be correlated with the received session setup request, which is then provided to the ICS UE 202 via a suitable alternative messaging scheme (e.g., USSD or SMS). As will be seen in further detail below, the ICS UE 202 then establishes a Mobile-Originated (MO) call via CS signaling to the ICS node 206 to set up the access leg.

Figure 3:
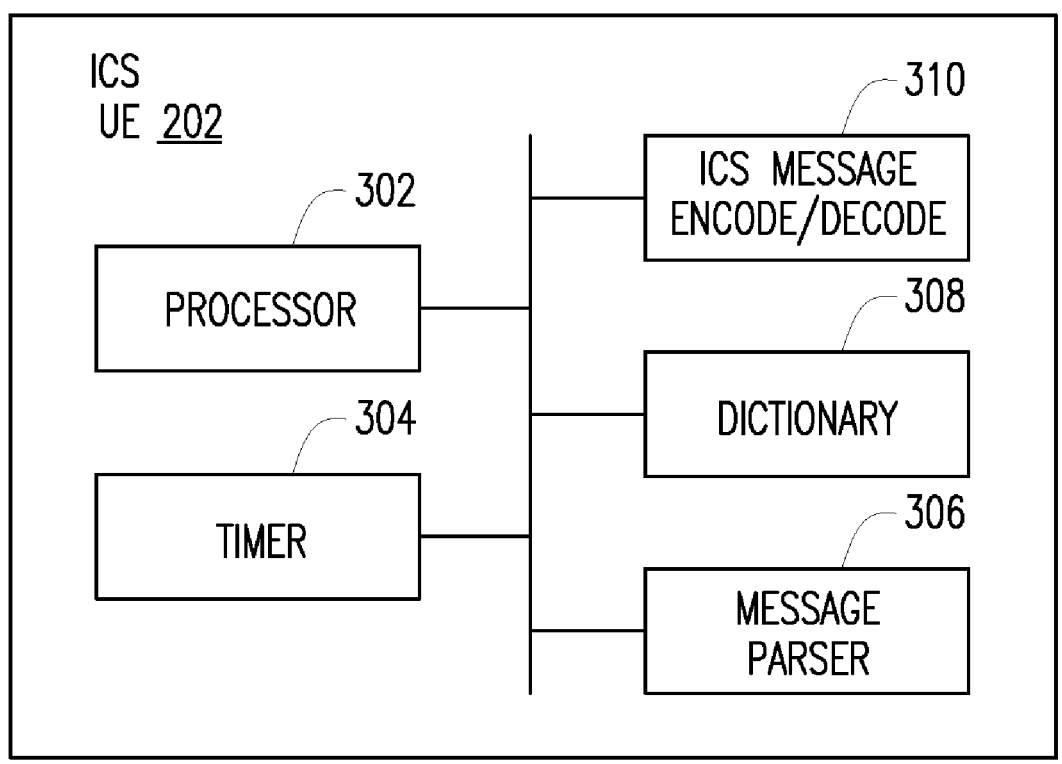
FIG. 3 depicts a block diagram of a User Equipment (UE) device according one embodiment.

Based on the foregoing, one skilled in the art will recognize that the functionality of the ICS UE 202 may include appropriate components that facilitate reception of call setup information via alternative signaling from the ICS node 206, processing of the received call setup information, and generation of appropriate responses and/requests to the ICS node 206. FIG. 3 depicts a block diagram of a UE device such as, e.g., ICS UE 202, according one embodiment. One or more processing entities 302 are provided for overall control of the various processes executable on the device. One or more timer mechanisms 304 may also be provided for effectuating timing control with respect to certain time-based functions. For efficient transfer of information, suitable message encode/decode blocks 310, dictionaries 308 and message parsers 306 may be provided. It will be recognized that functionalities such message encode/decode blocks, dictionaries and message parsers on the device side may be optional, and are generally dependent on the corresponding functionalities on the network side.

Figure 4:
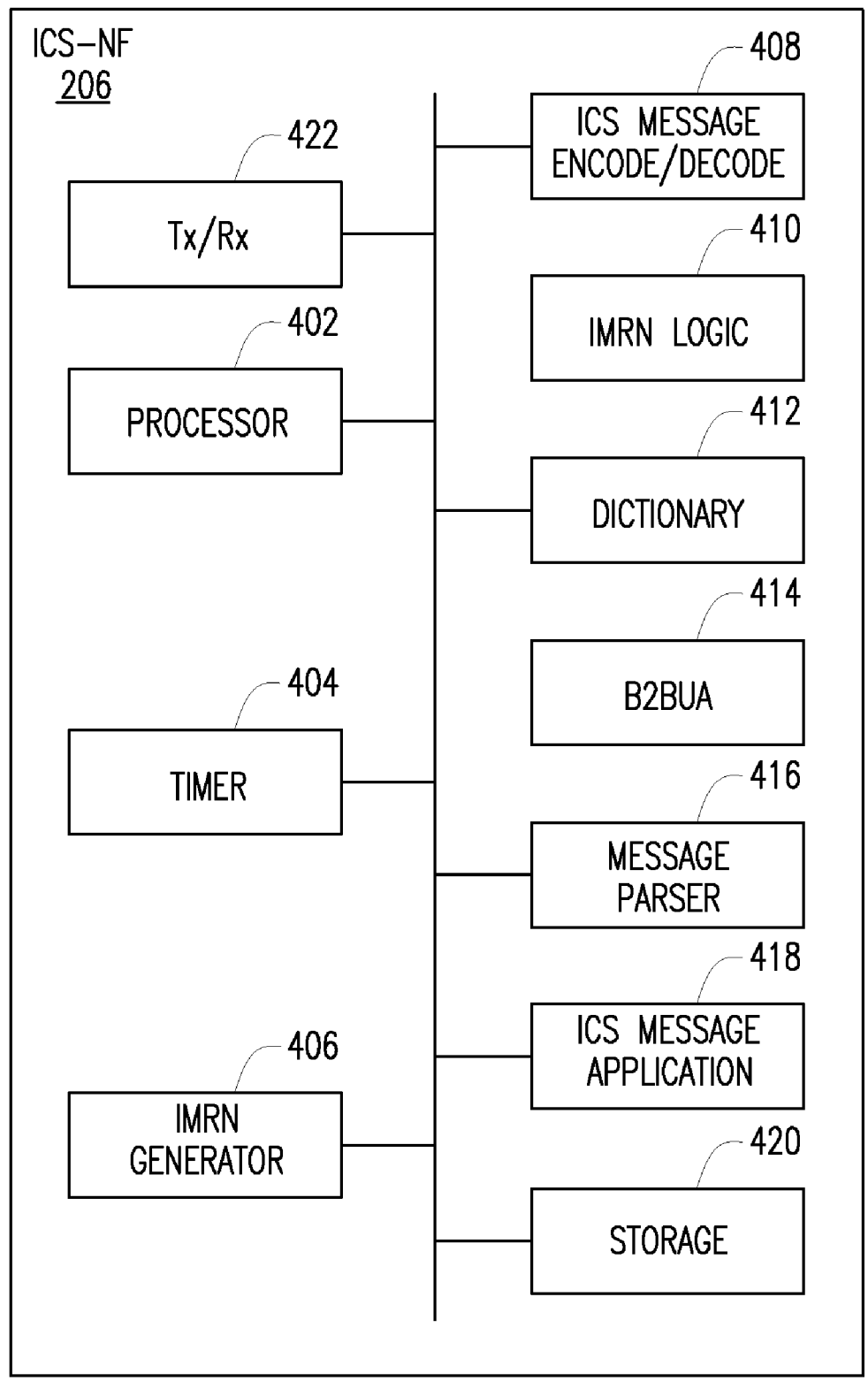
FIG. 4 depicts a block diagram of an IMS network node according one embodiment.

Similarly, the functionality of the ICS-NF node 206 may also include appropriate components that facilitate generation of suitable alternative signaling messages to the ICS UE device 202, reception and processing of the call setup information received from the ICS UE device 202, and generation of appropriate responses and/requests to the ICS UE device 202 as well as the remote party, i.e., calling party 204. FIG. 4 depicts a block diagram of an IMS network node, e.g., ICS-NF node 206, according one embodiment. One or more processing entities 402 are provided for overall control of the various processes executed by the ICS node 206 regardless of its architecture. A suitable transmit/receive (Tx/Rx) block 422 is operable to send or receive various messages over access and remotes legs of an MT call as will be set forth in detail below. A local storage module 420 may be provided for storing appropriate call information relating to the management of MT call delivery. An IMRN generator 406, IMRN mapping/logic 410 and one or more timer mechanisms 404 associated therewith may also be provided with respect the generation of IMRNs and their assignment/allocation, selection and management. A suitable ICS message application (e.g., USSD or SMS application) 418 may be co-located with a B2BUA functionality 414 for effectuating the MT call delivery process as outlined hereinabove. In addition, appropriate message encode/decode blocks 408, dictionaries 412 and message parsers 416 may be provided for purposes of efficient transfer of information.

Figure 5:
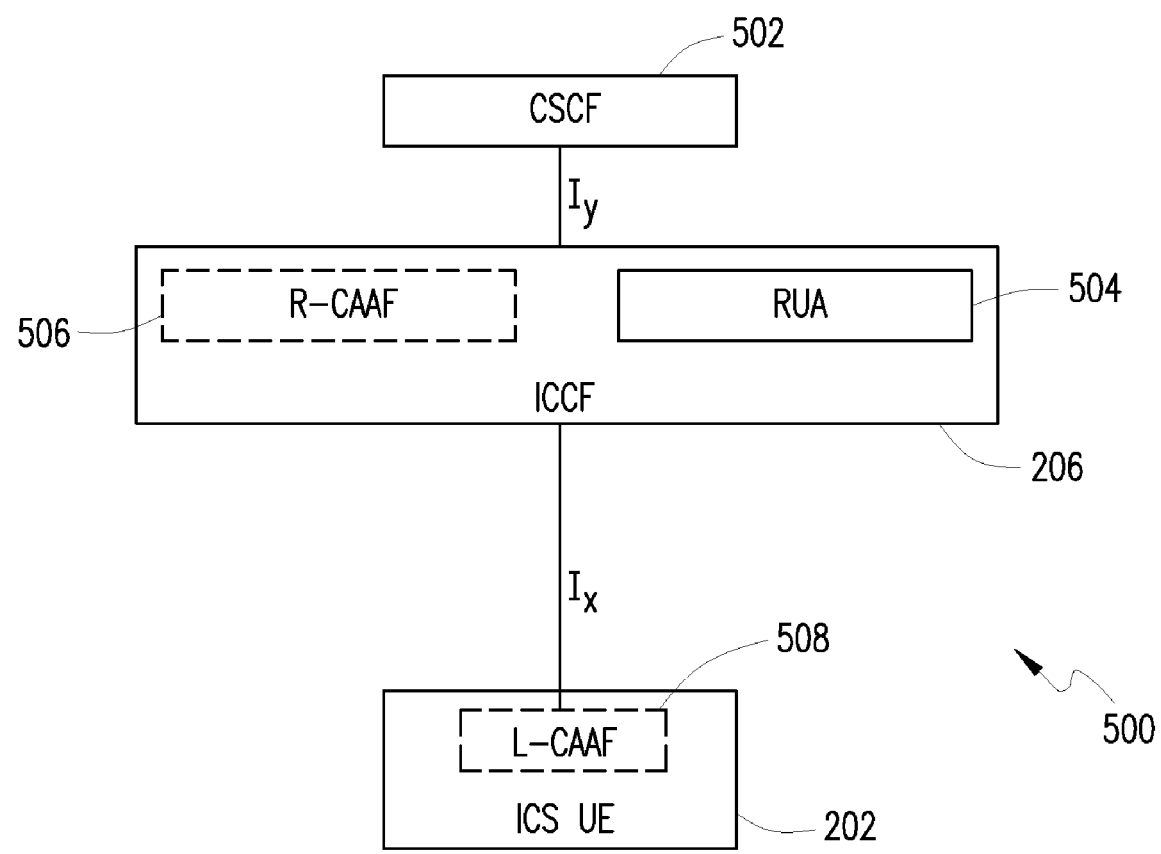
FIG. 5 depicts a reference point architecture associated with an embodiment of an IMS network node for purposes of the present patent disclosure.

FIG. 5 depicts a reference point architecture 500 associated with an embodiment of an IMS network node, e.g., ICE node 206, for purposes of the present patent disclosure. As pointed out previously, the ICE node 206 embodies an ICCF that supports functionality necessary for provisioning IMS services for calls originated or terminated over CS access networks. In a typical implementation, such a network functionality belongs to the IMS home network and is comprised of two functions: a Remote CS Access Adaptation Function (R-CAAF) 506 and a Remote User Agent (RUA) 504. Functionally, RUA 504 may be comprised of the B2BUA functionality 414 described above, and combines a CS call established between an ICE UE and the User Agent to set up a voice bearer as well as an IMS CS Control Channel (ICCC) established between the RUA and the UE, either directly or via the CAAF. It enables the completion of the call leg towards the ICE UE (i.e., the access leg, also referred to as the "UE leg"); and presents the session through a Call Session Control Function (CSCF) node, such as a Serving CSCF (S-CSCF) toward the other party, e.g., the calling party, via the remote leg (also referred to as the "RUA leg"). Thus, it can be seen that the UE leg and the RUA leg segments may be combined to form the B2BUA functionality at RUA 504. In one implementation, RUA 504 may be realized as an IMS Application Server (AS) element with an ISC interface to an S-CSCF 502. In this mode, it is invoked as the very first SIP AS in the originating calls and the last one in terminating calls, i.e., closest to the access. This approach for physical realization of RUA 504 may be referred to as the Application Server approach.

In another implementation, RUA 504 may be provided with a Gm interface to CSCF 502 operating as a Proxy CSCF or P-CSCF. In this mode, the RUA acts as an IMS UE remotely controlled from the ICS UE device, i.e., an ICS user connected via CS access and the RUA is perceived from the IMS point of view as an IMS user with bi-directional speech capabilities. This approach for physical realization of RUA 504 may be referred to as the IMS Adaptor approach.

Continuing to refer to FIG. 5, the CAAF is an adaptation function for the service control signaling between a CS network and the IMS. The CAAF is operable to convey the service control signaling information received from the ICS UE over CS domain access signaling to the RUA and vice versa. The RUA uses the information received from the CAAF for initiation and control of SIP sessions. In one implementation, the functionality of a CAAF may be segregated between the ICS node 206 and the ICS UE device 202. In such a scenario, R-CAAF 506 resides in conjunction with RUA 504 as part of the ICCF, whereas a Local CAAF component 508 may be provided in the ICS UE device 202 for enabling an ICCC with CS access signaling.

Figure 6A:
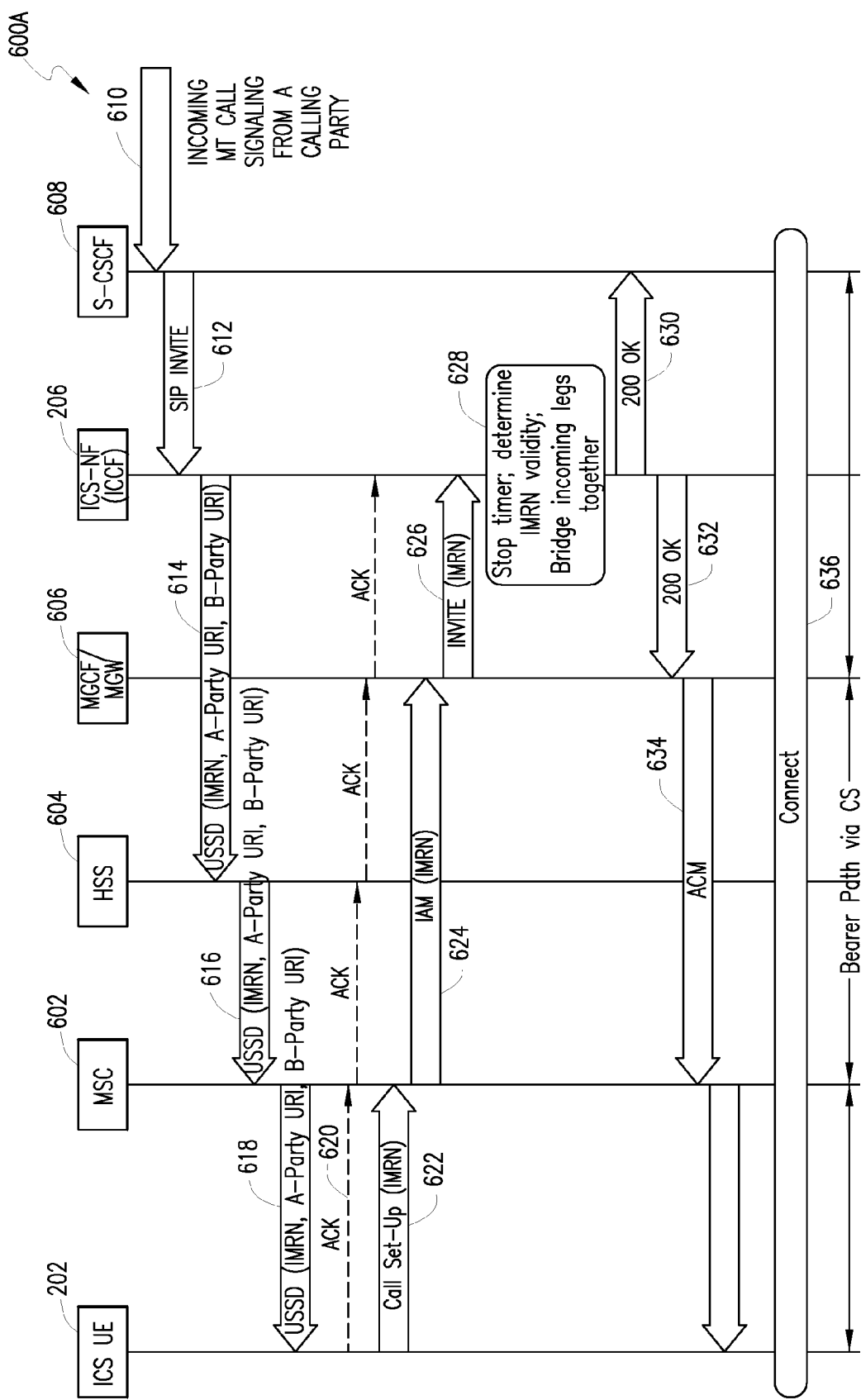
FIGS. 6A and 6B depict exemplary message flow diagrams for managing the delivery of an MT call according to one or more embodiments of the present patent disclosure.
Figure 6B:
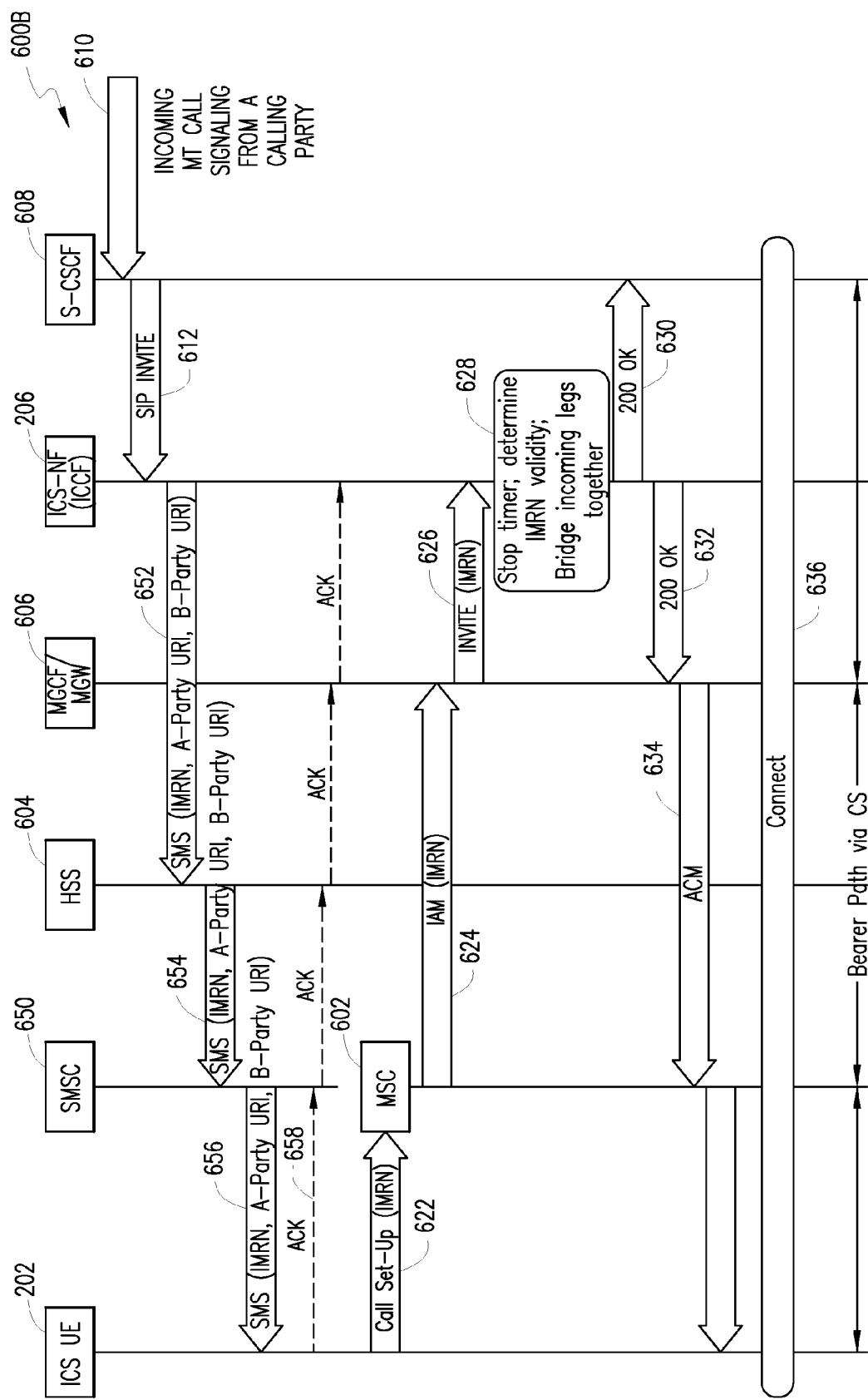

FIGS. 6A and 6B depict exemplary message flow diagrams for managing the delivery of an MT call according to one or more embodiments of the present patent disclosure. In particular, message flow diagram 600A shown in FIG. 6A exemplifies the use of USSD transport for facilitating session terminations to a UE device, e.g., ICS UE 202. Pursuant to receiving appropriate signaling messages with respect to an incoming MT call 610 from a calling party (not shown), an S-CSCF node 608 is operable to generate a SIP INVITE method request or message 612 towards an ICCF instance at an IMS network node, e.g., ICS-NF 206. In one embodiment, the ICCF instance may be bound to the target ICS UE device 202 of the call, and is operable to store the SIP request/response header field values or header field value fragments such as URI parameters received in the SIP INVITE method request 612 such as but not limited to TO, FROM, CONTACT, PRIVACY INDICATION, an identifier such as a Globally Routable User Agent Uniform Resource Identifier (GRUU), a Request Uniform Resource Identifier (R-URI), SDP, etc. Against this information, an IMRN such as, e.g., an E.164 number, is assigned (i.e., a mapping relationship or correlation record may be established between the IMRN and the received call information). In one embodiment, the IMRN may be dynamically allocated. In another embodiment, the IMRN may be assigned from a range or set of numbers, e.g., sequentially. Regardless of how an IMRN is generated and/or assigned, if the assigned IMRN is returned back from the ICE UE device 202, the ICS-NF 206 includes the functionality/logic operable to deduce the stored information and the corresponding remote call leg based on examining the mapping relationship.

Responsive to the SIP INVITE method request message 612, the ICS-NF node 206 initiates an ICS Incoming Call Request using one or more USSD messages 614 that include but not limited to the following: (i) an indication (e.g., a flag, etc.) to identify that USSD messaging 614 is for an ICS application; (ii) an indication (e.g., a flag, etc.) to identify that the message is for an MT call; (iii) A-Party Number or ID (e.g., SIP URI or Tel URI), if allowed, or an indication that A-Party ID is withheld; (iv) B-Party Number or ID, e.g., SIP URI or Tel URI; (v) GRUU; (vi) the Called Party's ID so that the B-Party knows which Public User ID it was called on, and so on, which may collectively be referred to as "call information." As illustrated in FIG. 6A, the USSD messaging 614 is directed to an HSS 604 that can identify a Mobile Switching Center (602) serving the ICS UE device 202. Although not explicitly shown in this FIG., a timer may be started at the ICS-NF node 206 to monitor the "staleness" or "timeliness" of the assigned IMRN that is sent out via USSD messaging 614. Accordingly, the timer is operable to keep track of the time elapsed between the transmission of USSD messaging 614 and the IMRN's reception at ICS-NF 206. The elapsed time may be compared against a threshold for determining whether the received IMRN is stale. Or, the timer may be programmed to time out after an expiration time, which may be preconfigured. In one embodiment, an IMRN received after the expiration time may be considered stale or invalid, and any MO call received at the ICS node 206 with that IMRN may be rejected.

In response to receiving USSD messaging 614, HSS 604 generates one or more USSD messages 616 towards MSC 602 (which in some cases may be Visited MSC or VMSC) associated with the ICS UE device 202. In one embodiment, MSC 602 may optionally page the ICS UE device 202. Regardless of such functionality, MSC 602 is operable to locate the UE device and forward one or more USSD messages 618 containing the various pieces of call information to the ICS UE device 202. In an optional arrangement, message flow 600A may include optional USSD Acknowledge (ACK) messages 620 that may be transmitted back to ICS-NF 206. Whether or not such ACK messaging is utilized, the ICS UE device 202 includes functionality to originate an MO voice call in the CS domain using the received IMRN according to any known or heretofore unknown procedures. Further, an application timer mechanism (not shown) may be initiated at the ICS UE device 202 to time the process of the MO call. For instance, the timer may be set for a certain time period, and when the timer expires, the call process may be attempted for a certain number of times (e.g., a maximum of 5 times). In one implementation, the ICS UE device 202 is operable to generate the MO call in accordance with the procedures set forth in 3GPP TS 23.018 and 3GPP TS 23.008 documentation in order to establish an access leg via the CS domain to ICS-NF 206. Accordingly, a call setup message 622 using the IMRN as the destination number is generated by the ICS UE device 202 towards MSC 602. In one implementation, the MO call is processed in the CS network domain according to CS origination procedures set forth in 3GPP TS 23.206, Clause 6.2.2. However, the associated CAMEL triggers may be deactivated due to the CAMEL deactivation trigger information being provided in the Mobile Application Part (MAP) Insert Subscriber Data. In response to the call setup message 622, MSC 602 generates an ISDN User Part (ISUP) Initial Address Message (IAM) 624 towards a Media Gateway Controller Function (MGCF) 606 that is in turn operable to transmit a SIP INVITE method request or message 626 towards the ICS node 206. Those skilled in the art will recognize that there may be additional intermediary network entities involved in mediating the message flow between MGCF 606 and the ICS node 206, with additional/optional parameters. For instance, MGCF 606 may initiate a SIP INVITE method request towards an Interrogating CSCF (I-CSCF) in the home IMS network associated with the ICS UE device 202, which I-CSCF may then route the SIP INVITE method request to the ICS node 206 using one of the standard procedures set forth in 3GPP TS 23.228 documentation. The SIP INVITE method request 626 may also contain a P-Network-Access-Info Header field indicating that the SIP INVITE method request has been generated from the CS domain. Moreover, the SIP INVITE method request contains an indication that the bearer path is to be set over the CS domain. Further, although direct routing to the ICS node 206 is illustrated in FIG. 6A, routing via an S-CSCF may also be implemented in certain embodiments. Additionally, where a Public Service Identity (PSI) is utilized (e.g., one that matches the IMRN), the applicable ISC and Ma reference points are supported by the ICS node 206.

Responsive to receiving the SIP INVITE method request 626, the IMRN-based timer may be stopped and the ICS node 206 is operable to analyze the received IMRN for further processing. Upon determining that the received IMRN is valid (i.e., the IMRN is not timed out based on a time-to-live or life time parameter), the ICS node 206 cross-references or otherwise correlates the IMRN with the stored information so that it can identify the appropriate remote leg with respect to completing the incoming call from the ICS UE device 202. Thereafter, the access and remote call legs are bridged using the B2BUA functionality. The IMRN may then be released for immediate use or returned to a quarantine pool for a period of time after which it may be reused again at some suitable point. These processes are exemplified in block 628. The ICS node 206 returns a SIP 200 (OK) response message 630 to S-CSCF 608, which is propagated eventually to the calling party that initiated the MT call. Likewise, a SIP 200 (OK) response message 632 is transmitted on the access leg towards MGCF 606, which then generates an ISUP Address Complete Message (ACM) 634 towards the ICS UE device 202. It should be noted that the SIP 200 (OK) response messages 630 and 632 may be generated in parallel or in any sequential order. Thereafter, an end-to-end bearer path 636 for the transmission of media is established between the ICS UE device 202 and the calling party (not shown).

Referring now to FIG. 6B, message flow diagram 600B shown therein exemplifies the use of SMS transport for facilitating session terminations to ICS UE 202. It will be recognized that the message flow relative to the SMS transport is substantially similar to the USSD message flow described in detail hereinabove. Accordingly, only certain highlights are set forth below with respect to the message flow 600B. As before, S-CSCF node 608 is operable to generate a SIP INVITE method request message 612 towards an ICCF instance at an IMS network node, e.g., ICS-NF 206, pursuant to receiving appropriate signaling messages with respect to an incoming MT call 610 from a calling party (not shown), wherein SIP request header field values or header field fragments such as URI parameters, e.g., values for TO, FROM, CONTACT, PRIVACY INDICATION, GRUU, R-URI, SDP, etc., are transported. Against this information, an IMRN may be assigned (i.e., a mapping relationship or correlation record may be established between the IMRN and the received call information), which may be generated and managed in accordance with one or more procedures set forth above. Further, similar to the USSD-based message flow in FIG. 6A, the ICS-NF node 206 includes the functionality/logic operable to deduce the stored information and the corresponding remote call leg based on examining the IRMN when it is returned back.

Responsive to the SIP INVITE method request message 612, the ICS-NF node 206 initiates an ICS Incoming Call Request using one or more SMS messages 652 that include the various pieces of call information as described previously. SMS messaging 652 is directed to HSS 604 that can identify a Short Message Server Center (SMSC) 650 associated with ICS UE 202. Again, appropriate timer mechanisms may be implemented at the ICS node 206 to monitor and determine if an assigned IMRN is valid or not upon its return. HSS 604 is operable to propagate the SMS messages 654 to SMSC 650 which then provides suitable SMS messaging 656 along with the call information contained therein to ICS UE 202. Those skilled in the art will recognize that when SMS is used to announce incoming calls to a UE device, a separate mailbox may be necessary which must not become full since a full SMS mailbox can prevent signaling of calls using SMS. In one embodiment, optional SMS Acknowledgement (ACK) messaging 658 may be propagated from ICS UE 202 towards the ICS node 206. Thereafter, the ICS UE device 202 may initiate an MO voice call in the CS domain using the received IMRN according to the methodologies set forth previously, with applicable modifications, if any. Accordingly, appropriate call setup messaging 622 using the IMRN as the destination number is generated by the ICS UE device 202 towards MSC 602 serving the ICS UE device 202. Although there may be other network elements in addition to the elements shown, the messaging flow thereafter remains basically the same as that of the USSD-based flow shown in FIG. 6A, mutatis mutandis, in order to effectuate the bearer path 636 between ICE UE 200 and the calling party.

Those skilled in the art will recognize that the foregoing signaling flow scenarios may be implemented regardless of whether the ICS UE device 202 is attached to an MSC node that is enhanced for ICS or not. In either implementation, the incoming session may be delivered over the I1 reference point and the media bearer path is established via the CS network. Furthermore, although the USSD and SMS messages are particularly exemplified for purposes of providing an alternative signaling mechanism, supplementary messages such as additional CS domain-based Facility messages may also be utilized for purposes of the present patent disclosure.

Figure 7A:
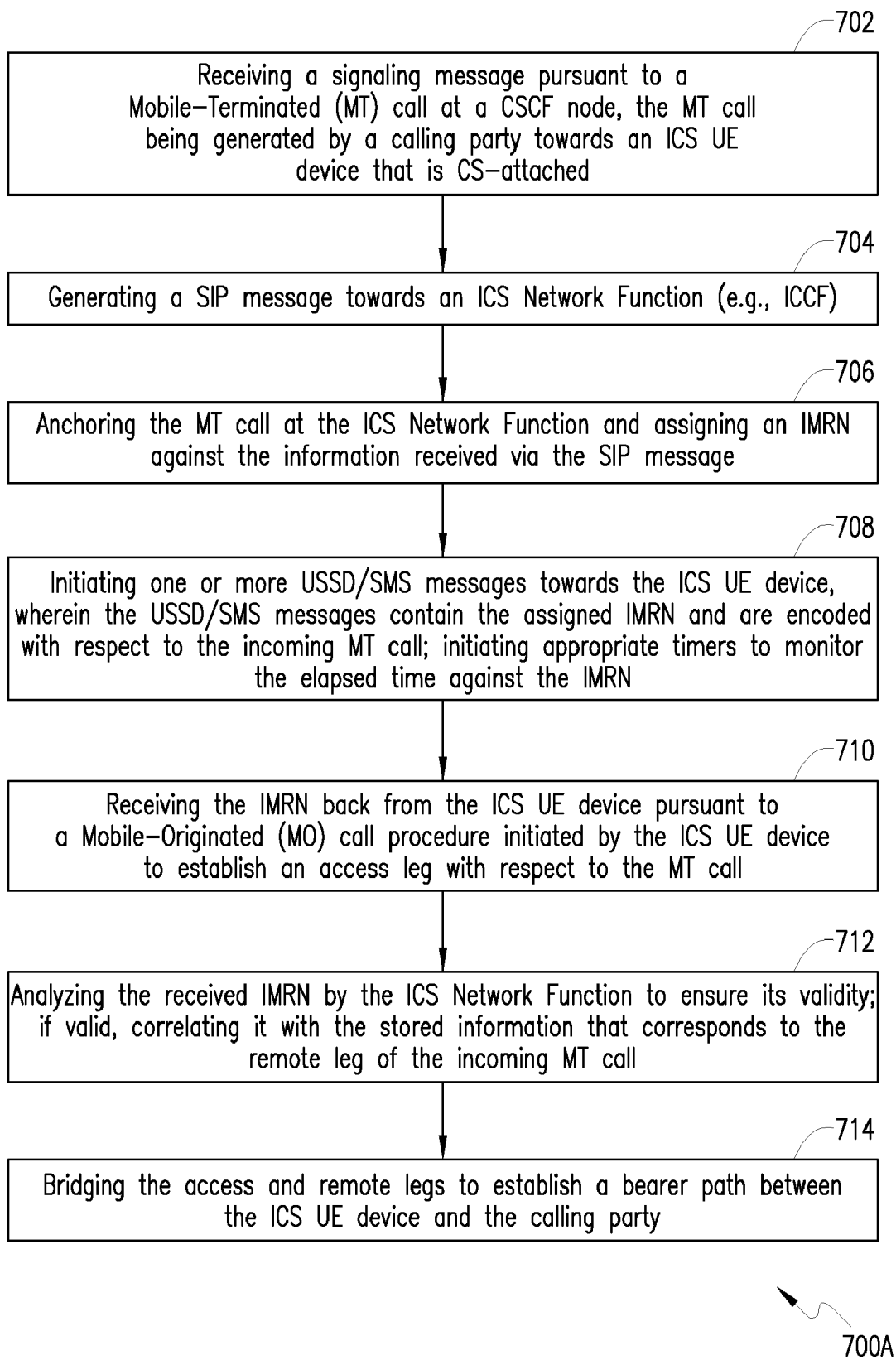
FIGS. 7A and 7B depict exemplary flowcharts associated with one or more embodiments operable at an IMS network node.
Figure 7B:
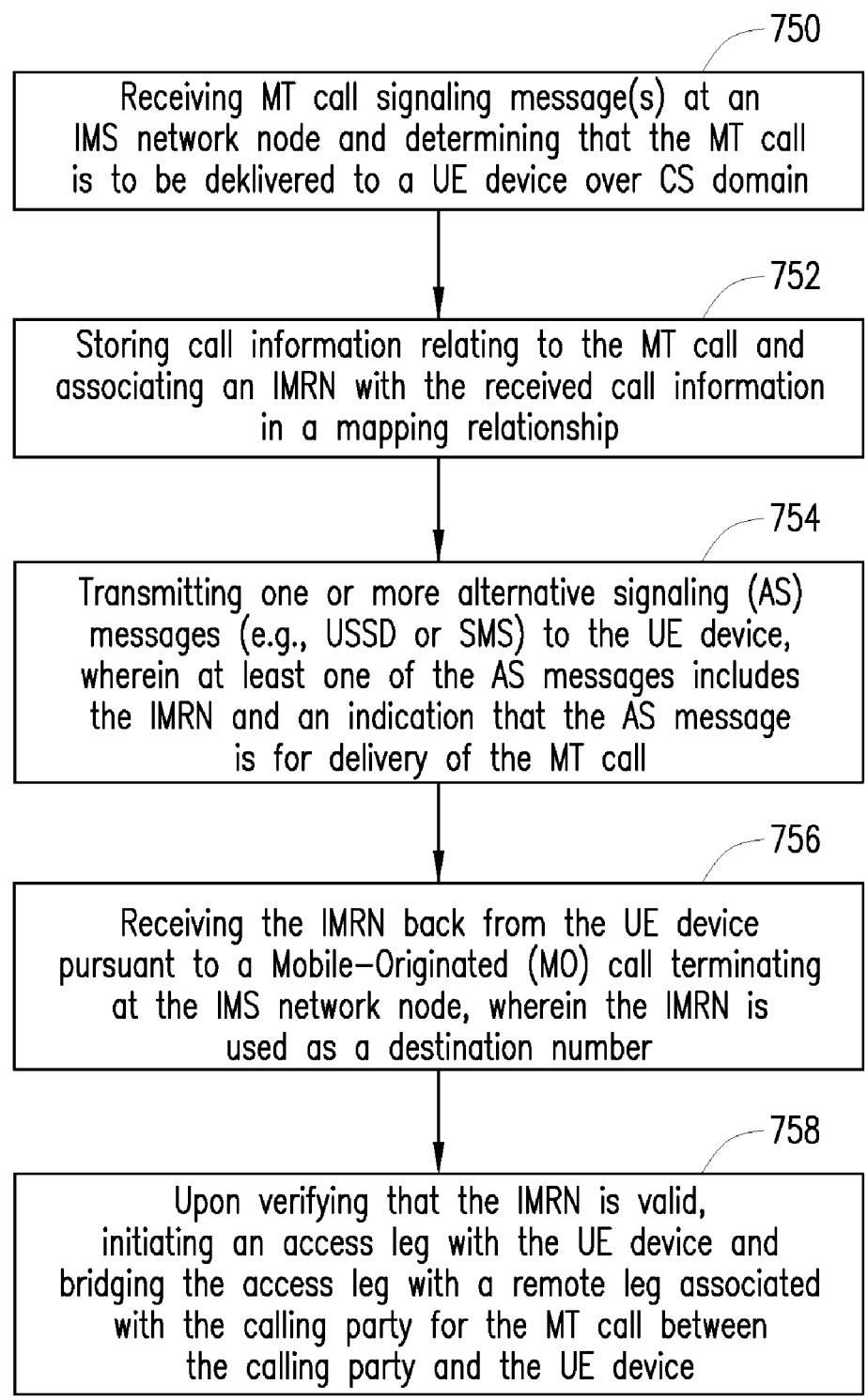

FIGS. 7A and 7B depict exemplary flowcharts associated with one or more embodiments of the present patent disclosure in accordance with one or more parts of the message flow diagrams described above. Reference numeral 700A in FIG. 7A refers to a scheme of operations that take place at the network side in one embodiment. A signaling message pursuant to an MT call is received at a CSCF node, wherein the MT call generated by a calling party towards an ICS UE device that is CS-attached (block 702). A SIP request message (e.g., a SIP INVITE method request) is generated towards an ICCF embodied in an ICS node (block 704) which anchors the MT call and assigns an IMRN against the call information received via the SIP request (block 706). One or more alternative signaling messages (e.g., USSD or SMS messages) are generated towards the ICS UE device, wherein the alternative signaling messages are operable to contain the assigned IMRN and are encoded with applicable call information relative to the incoming MT call on the remote leg. Appropriate timers may be initiated to monitor the elapsed time against the assigned IMRN. These operations are set forth in block 708. Upon receiving the assigned IMRN back from the ICS UE device pursuant to a MO call procedure initiated the ICS UE device to establish an access leg (block 710), the ICS node is operable to analyze the received IMRN to ensure its validity; and if valid, correlate it against the stored information that corresponds to the remote leg of the incoming MT call (block 712). Thereafter, the access and remote legs are bridged in order to establish an end-to-end bearer path between the ICS UE device and the calling party (block 714).

Reference numeral 700B in FIG. 7B refers to another embodiment that sets forth the operations at the network side regardless of whether the functionality of the CSCF and ICCF entities are integrated into a single IMS network node. At block 750, a message relating to an MT call is received, wherein the message can be a SIP INVITE method request, as described above. Appropriate logic operating at the IMS network node is operable to determine that the MT call is to be delivered to a UE device over a CS domain. Call information received via the signaling message is stored and associated with an IMRN in a mapping relationship (block 752). The IMRN can be dynamically generated, or selected from a pool of numbers, or otherwise provisioned. One or more alternative signaling (AS) messages (e.g., USSD or SMS messages) are transmitted to the UE device, wherein at least one of the AS messages includes the IMRN and an indication that the AS messaging is for delivery of the MT call (block 754). Thereafter, the IMRN is received back from the UE device pursuant to an MO call terminating at the IMS network node, wherein the IMRN is used as a destination number (block 756). Upon verifying that the IMRN is valid, the service logic at the network node is operable to initiate an access leg with the UE device and bridge the access leg with a remote leg associated with the calling party for establishing an end-to-end path for the MT call between the calling party and the UE device (block 758).

Figure 8:
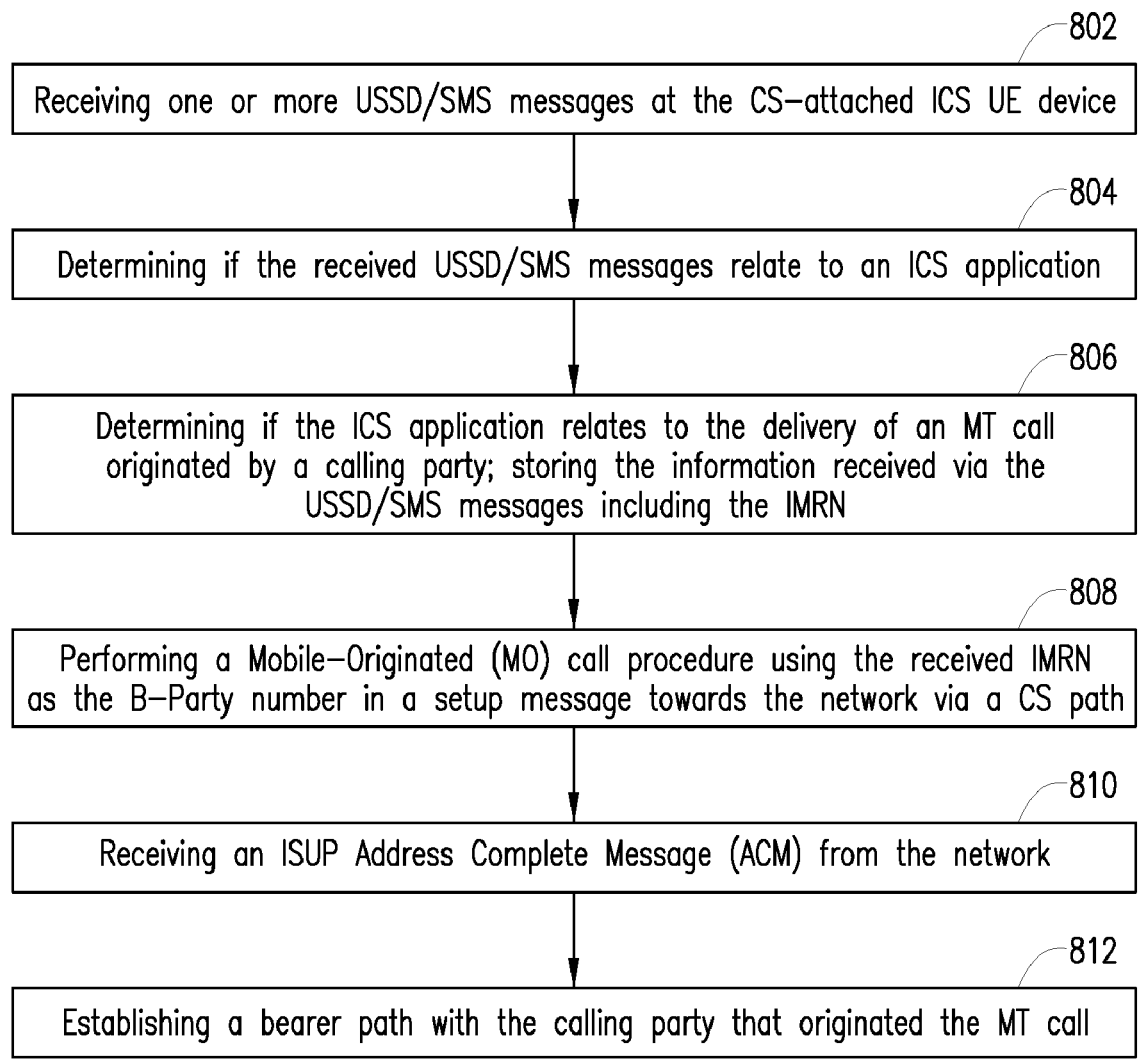
FIG. 8 depicts an exemplary flowchart associated with an embodiment operable at a UE device.

FIG. 8 refers to a scheme of operations 800 that take place at an ICS-capable UE device. Upon receiving one or more AS messages (i.e., USSD or SMS messages) at the CS-attached ICS UE device (block 802), a determination is made if the received alternative signaling messages relate to an ICS application (block 804). If so, another determination may be made as to whether the ICS application relates to the delivery of an MT call originated by a calling party. If so, the call information received via the alternative signaling mechanism, including an IMRN, may be stored at the ICS UE device. The call information may also include a token or flag (or other indicator) to identify that a call be made over a CS domain for completing the MT call. These operations are set forth in block 806. As alluded to previously, optional acknowledgement messaging towards the network may be effectuated by the ICS UE device, in addition to initiating a suitable application timer for timing the call process. Thereafter, an MO call procedure is performed by the UE device using the IMRN as the destination number (i.e., the B-Party number) towards the network via a CS path (block 810). Upon receiving an Address Complete Message (ACM) from the network (block 810), the ICS UE device engages in a call session carried via an end-to-end bearer path established with the calling party (block 812).

To manage a pool of dynamically allocable IMRNs, the network node (e.g., ICS-NF 206) may be configured in a number of ways with respect to the use of E.164 numbers as IMRNs. For example, a particular E.164 number may be provided as a "starting address" number of an IMRN range or set. Another E.164 number may operate as a range/set delimiter with respect to the IMRN range or set. To allow flexibility, it may be desirable to provide for different pools of IMRNs to be configured from different number ranges. Further, additional time-based parameters may be provisioned such as, for example, (i) life time an IMRN can live for and (ii) quarantine time of an IMRN, that is, the duration for which an IMRN cannot be reused after it has been released back to the IMRN pool. In addition, the functional behavior of the ICS node functionality involves the following: if the ICS node receives a SIP INVITE method request that contains a Request URI (R-URI) for a B-Party number that has ICS services (e.g., the number associated with the ICS UE device), appropriate service logic at the ICS node is operable to determine via, for example, Domain Selection functionality and other mechanisms such as presence, HSS-mediated methodologies, etc., the domain that the ICS UE device is in and how the device registered in that domain. As described previously, the ICS node is operable to assign an IMRN to the received GRUU via the SIP INVITE method request. A number of mapping relations may be achieved between the IMRN and other information elements of the received call information in any combination: e.g., IMRN=>{QRUU; P-Asserted-Identity(ies); P-Called-Party-ID; B-number; A-number+Privacy ID, etc.}. Upon receipt of a SIP INVITE method request from an MGCF with the map-assigned IMRN as the R-URI on the access leg, appropriate timer mechanisms are operable to determine validity of the IMRN, enforce a quarantine procedure, etc.

From the perspective of the device side, the functionality of an ICS-capable UE device includes appropriate logic to determine if a received USSD or SMS message or messages is/are with respect to an ICS application. In one embodiment, such determination may be effectuated by analyzing the contents of the received message to determine if there is a flag or other indicator associated therewith. Likewise, additional flags or other indicators may be employed to indicate that the received messaging is for an MT call. After effectuating an MO call based on suitable CS origination procedures, the UE device may receive an alerting message. The UE device may include service logic that facilitates, upon receipt of the alerting message, displaying of the A-Party identity if it has been received and the B-Party address that was used to address the UE device with respect to the MT call.

Figure 9A:
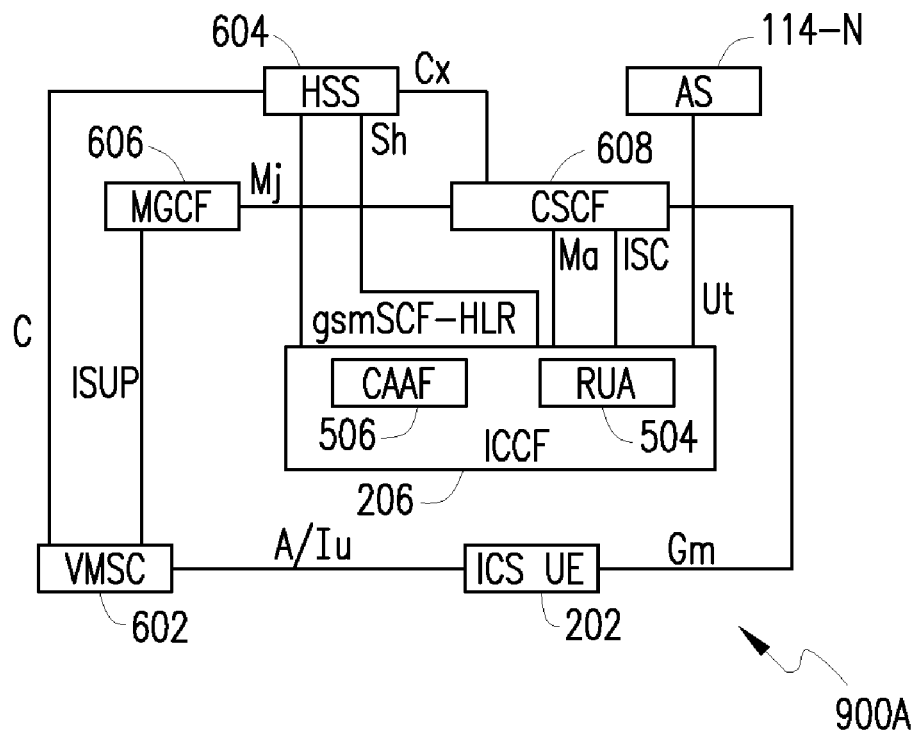
FIG. 9A-9C depict exemplary reference point architectures for purposes of the present patent disclosure.
Figure 9B:
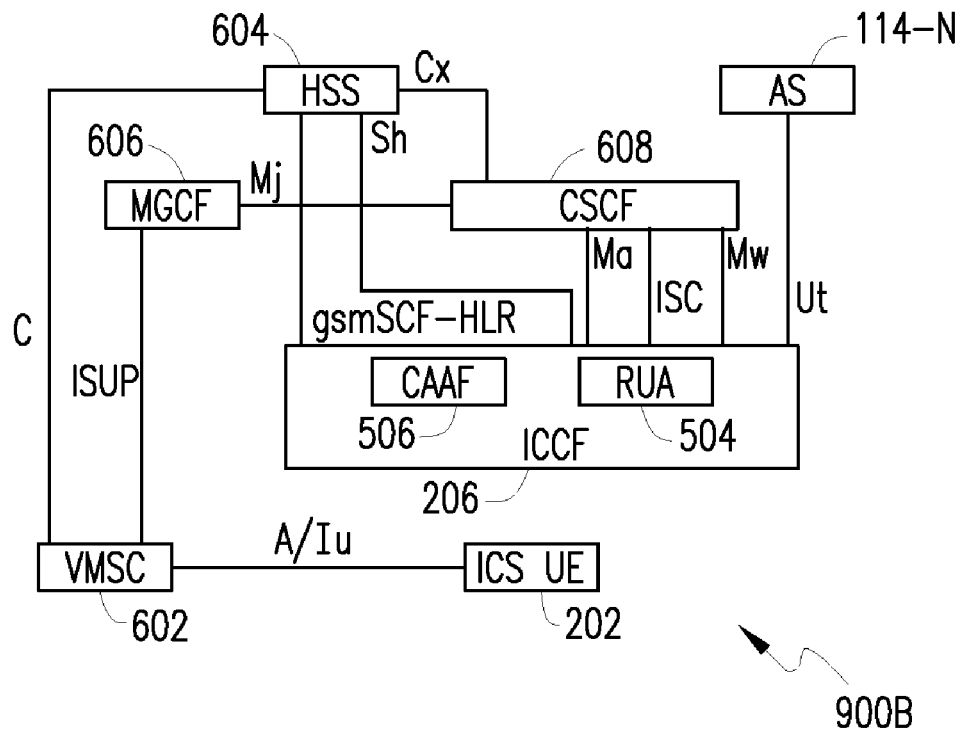
Figure 9C:
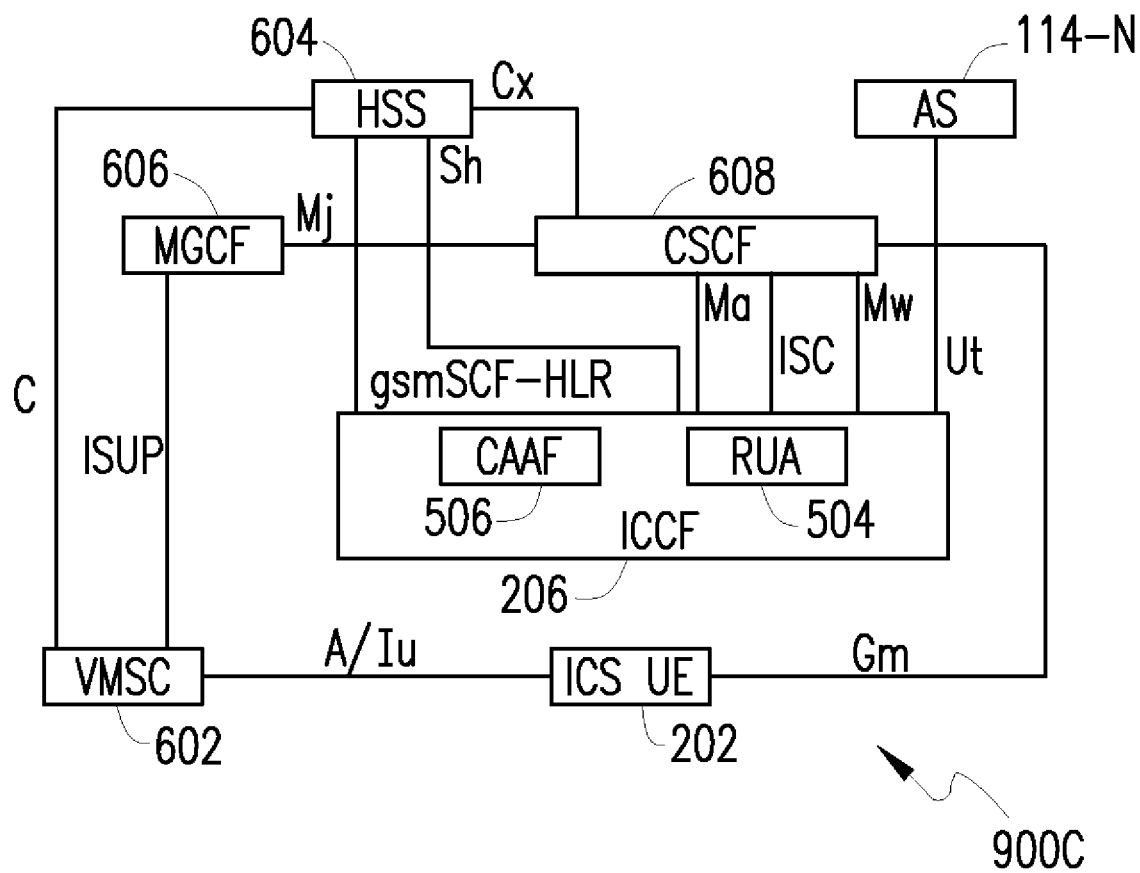

FIG. 9A-9C depict exemplary reference point architectures associated with an IMS environment for purposes of the present patent disclosure. Reference numeral 900A in FIG. 9A refers to an implementation where an Application Server approach is represented. The ICCF/ICS node 206 is realized as an IMS Application Server with an IMS Session Control (ISC) interface to the S-CSCF for both I1-cs and I1-ps. An A/Iu reference point interface is provided between ICS UE device 202 and VMSC 602, which in turn uses an ISUP interface with MGCF 606. An Mj reference point interface is provided between MGCF 606 and CSCF 608, which interfaces with HSS 604 via a Cx reference point interface. The ICS node 206 also interfaces with HSS 604 via an Sh reference point interface and with another Application Server such as AS 114-N via a Ut reference point interface. An Ma reference point interface is also disposed between CSCF 608 and the ICS node 206. A Gm reference point interface is provided between ICS UE device 202 and CSCF 608. Further, the CAAF of the ICS node 206 presents a MAP/gsmSCF-HLR interface towards HSS 604 for effectuating appropriate alternative signaling.

FIG. 9B depicts an IMS adaptor model 900B wherein the ICCF/ICS node 206 is provided with an Mw reference point towards CSCF 608 and the ISC for I1-cs only. The reference point architecture 900C depicted in FIG. 9C is representative of an IMS adaptor approach for both I1-cs and I1-ps.

Upon receipt of the USSD or SMS messages, the ICS UE device is operable to apply special call processing that may include decoding the contents of the received messages and setting up a call towards the decoded IMRN as the destination number. In one exemplary implementation, such a call setup may proceed only after receiving consent from the user operating the ICS UE device. The requirement of the necessary special call processing may be signaled by a suitable code point provided in the coding of the USSD or SMS messages from the ICS network node towards the UE device. In one implementation, any reserved codings may be assumed by the receiving entity to be the GSM 7-bit default alphabet (the same as code point [00001111]). The octet may be used according to a coding group that is indicated in bits [7:4]. The following Tables 1A through 1F illustrate an exemplary coding scheme:

TABLE 1A

| Coding Group Bits 7...4 | Use of bits 3...0 |
| --- | --- |
| 0000 | Language using the GSM 7 bit default alphabet Bits 3...0 indicate the language: <br> 0000 German <br> 0001 English <br> 0010 Italian <br> 0011 French <br> 0100 Spanish <br> 0101 Dutch <br> 0110 Swedish <br> 0111 Danish <br> 1000 Portuguese <br> 1001 Finnish <br> 1010 Norwegian <br> 1011 Greek <br> 1100 Turkish <br> 1101 Hungarian <br> 1110 Polish <br> 1111 Language unspecified |

TABLE 1B

| Coding Group Bits 7...4 | Use of bits 3...0 | |
| --- | --- | --- |
| 0001 | 0000 | GSM 7 bit default alphabet; message preceded by language indication. The first 3 characters of the message are a two-character representation of the language |

TABLE 1B-continued

| Coding Group Bits 7...4 | Use of bits 3...0 | |
|---|---|---|
| | | encoded according to ISO 639, followed by a CR character. The CR character is then followed by 90 characters of text. |
| | 0001 | UCS2; message preceded by language indication<br>The message starts with a two GSM 7-bit default alphabet character representation of the language encoded according to ISO 639. This is padded to the octet boundary with two bits set to 0 and then followed by 40 characters of UCS2-encoded message. An MS not supporting UCS2 coding will present the two character language identifier followed by improperly interpreted user data. |
| | 0010...1111 | Reserved |

TABLE 1C

| Coding Group Bits 7...4 | Use of bits 3...0 | |
|---|---|---|
| 0010... | 0000 | Czech |
| | 0001 | Hebrew |
| | 0010 | Arabic |
| | 0011 | Russian |
| | 0100 | Icelandic |
| | 0101...1111 | Reserved for other languages using the GSM 7 bit default alphabet, with unspecified handling at the MS |
| 0011 | 0000...1111 | Reserved for other languages using the GSM 7 bit default alphabet, with unspecified handling at the MS |

TABLE 1D

| Coding Group Bits 7...4 | Use of bits 3...0 |
|---|---|
| 01xx | General Data Coding indication<br>Bits 5...0 indicate the following:<br>Bit 5, if set to 0, indicates the text is uncompressed<br>Bit 5, if set to 1, indicates the text is compressed using the compression algorithm defined in 3GPP TS 23.042<br>Bit 4, if set to 0, indicates that bits 1 to 0 are reserved and have no message class meaning<br>Bit 4, if set to 1, indicates that bits 1 to 0 have a message class meaning:<br>Bit 1 Bit 0 Message Class:<br>  0    0  Class 0<br>  0    1  Class 1 Default meaning: ME-specific.<br>  1    0  Class 2 (U)SIM specific message.<br>  1    1  Class 3 Default meaning: TE-specific (see 3GPP TS 27.005)<br>Bits 3 and 2 indicate the character set being used, as follows:<br>Bit 3 Bit 2 Character set:<br>  0    0  GSM 7 bit default alphabet<br>  0    1  8 bit data<br>  1    0  UCS2 (16 bit)<br>  1    1  Reserved |
| 1000 | Reserved coding groups |

TABLE 1E

| Coding Group Bits 7...4 | Use of bits 3...0 |
|---|---|
| 1001 | Message with User Data Header (UDH) structure:<br>Bit 1 Bit 0 Message Class:<br>  0    0  Class 0<br>  0    1  Class 1 Default meaning: ME-specific.<br>  1    0  Class 2 (U)SIM specific message.<br>  1    1  Class 3 Default meaning: TE-specific (see 3GPP TS 27.005)<br>Bits 3 and 2 indicate the alphabet being used, as follows:<br>Bit 3 Bit 2 Alphabet:<br>  0    0  GSM 7 bit default alphabet<br>  0    1  8 bit data<br>  1    0  USC2 (16 bit)<br>  1    1  Reserved |
| 1010...1100 | Reserved coding groups |
| 1101 | Defined for IMS Centralized Services<br>Bit 1 Bit 0 Message Class:<br>  0    0  Reserved<br>  0    1  Class 1 Default meaning: ME-specific.<br>  1    0  Reserved<br>  1    1  Reserved<br>Bits 3 and 2 indicate the alphabet being used, as follows:<br>Bit 3 Bit 2 Alphabet:<br>  0    0  Reserved<br>  0    1  8 bit data<br>  1    0  Reserved<br>  1    1  Reserved |

TABLE 1F

| Coding Group Bits 7...4 | Use of bits 3...0 |
|---|---|
| 1110 | Defined by the WAP Forum |
| 1111 | Data coding/message handling<br>Bit 3 is reserved, set to 0.<br>Bit 2    Message coding:<br>  0    GSM 7 bit default alphabet<br>  1    8 bit data<br>Bit 1 Bit 0 Message Class:<br>  0    0  No message class.<br>  0    1  Class 1 user defined.<br>  1    0  Class 2 user defined.<br>  1    1  Class 3 default meaning: TE specific (see 3GPP TS 27.005) |

The foregoing codings may also be used for USSD and Man-Machine Interface (MMI)/display purposes. In an exemplary implementation, specific coding values applicable to USSD for Mobile-Originated USSD messages and Mobile-Terminated USSD messages may be provided in accordance with 3GPP TS 24.090 documentation. In such an implementation, USSD messages using the default alphabet may be coded with the GSM 7-bit default alphabet provided in Clause 6.2.1 of the documentation, wherein the messages may then include up to 182 user characters, by way of an example.

Figure 10:
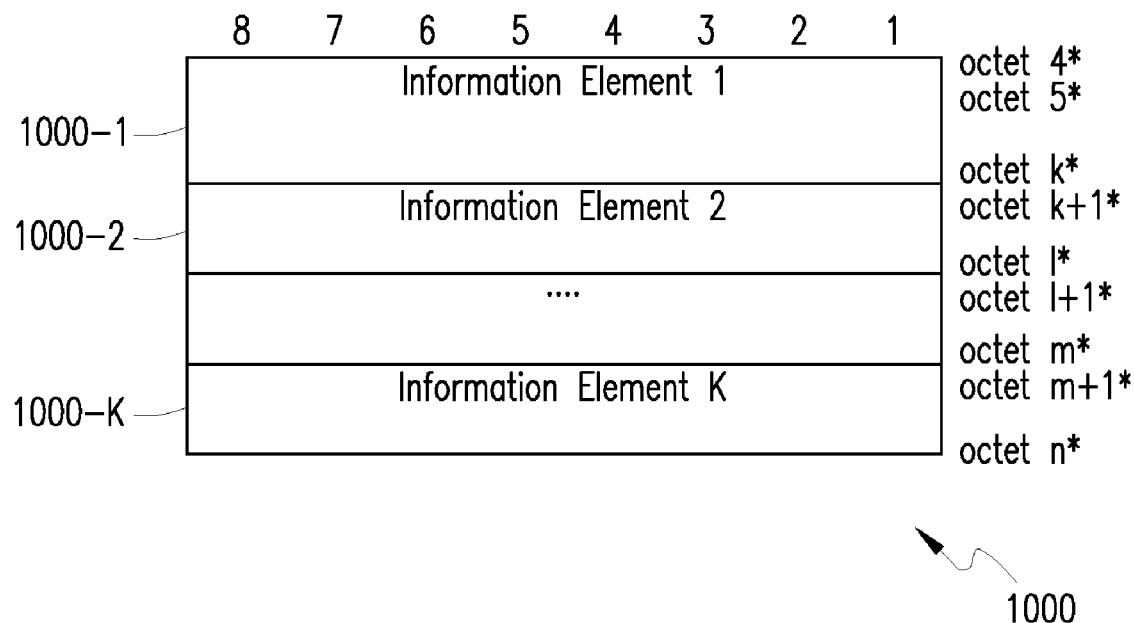
FIG. 10 depicts an exemplary structure for transporting ICS protocol information according to one embodiment.

Applicable IMS CS Control Protocol (ICCP) contents may be included in a suitable alternative signaling message application such as USSD or SMS messages, possibly with appropriate encoding and compression for efficient data transfer. In one embodiment, the user-user protocol contents may be structured like the non-imperative part of a standard Layer-3 (L3) message and may comprise a variable number of information elements (IEs) of type 1, 2, 3, and 4. Different formats, e.g., Tag-Value (TV) and Tag-Length-Value (TLV) formats (sometimes also referred to as Type-Variable or Type-Length-Variable formats, respectively), etc., and the categories of IEs, e.g., types 1, 2, 3, and 4, may be provided in accordance with 3GPP TS 24.007 documentation. Within the ICCP contents, the IEs may occur in an arbitrary order, and may only be included once, wherein each IE may comprise one or more octets. FIG. 10 depicts an exemplary structure 1000 for transporting ICS protocol information according to one embodiment, wherein a plurality of IEs 1000-1 through 1000-K are provided. In the exemplary embodiment, each IE is shown to comprise a number of octets, e.g., two octets, although other arrangements are also possible. Further, the data structure 1000 may be designed so as to accommodate any number of USSD/SMS messages that may be concatenated or otherwise manipulated.

Figure 11A:
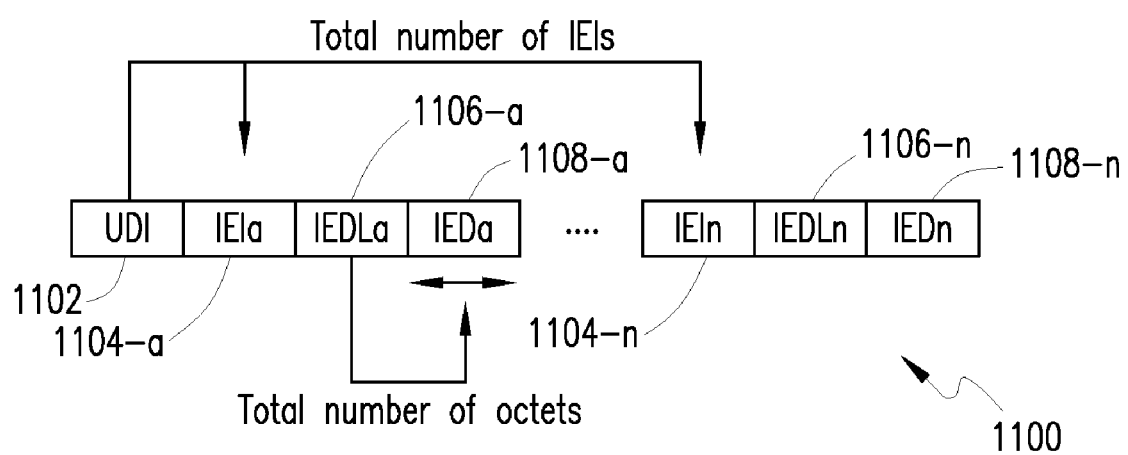
FIG. 11A depicts an exemplary data structure for transporting user data information according to one embodiment.

In certain embodiments, ICS requests can span multiple USSD/SMS requests/messages in a single transaction. FIG. 11A depicts an exemplary data structure 1100 for transporting user data information according to one embodiment. A plurality of User Data Items (UDIS), e.g., UDI 1102, may be provided with respect to the user data. The total number of UDIs may be preconfigured, e.g., 128 UDIs. If the most significant bit is set in the UDI, the UDI uses a consecutive eight bits (i.e., an octet). Otherwise, the UDI uses consecutive four bits (half an octet). The remaining three or seven bits are encoded in a big-endian order, e.g., with the most significant bit (MSB) first. For example, the integer value 0x0A would be encoded with one octet [0x8A]. The integer value 0x06 would be encoded in four consecutive bits: [0x06]. Each UDI may comprise a number of unique Information Element Identifiers (IEIs) 1104-a through 1104-n. For example, UDI 1102 may include up to 256 IEIs. Depending on the IEI, an Information Element Data Length (IEDL) and/or an Information Element Data (IED) may be provided for each IEI. As exemplified in FIG. 11A, IEIa 1104-a includes IEDLa 1106-a that indicates the length of the actual user data in octets, e.g., IEDa 1108-a. Likewise, IEIn 1104-n is exemplified with IDELn 1106-n with respect to IEDn 1108-n. The data type of the IEDL variable can be an 8-bit, unsigned integer (u_int8) or a 32-bit unsigned integer, encoded in multi-byte integer format (mb_u_int32). A multi-byte integer may comprise a series of octets where the most significant bit is the continuation flag and the remaining seven bits are a scalar value. The continuation flag is operable to indicate that an octet is not the end of the multi-byte sequence. A single integer value may be encoded into a sequence of N octets. The first N−1 octets have a continuation flag that may be set to a particular binary value, e.g., binary 1. Likewise, the final octet in the series may be provided with a continuation flag that has a binary value of 0. The remaining seven bits in each octet may be encoded in a big-endian order, i.e., with the MSB first. The octets may also be arranged in a big-endian order, e.g., the most significant seven bits are transmitted first. In the situation where the initial octet has fewer than seven bits of value, all unused bits may be set to zero. By way of example, the integer value 0xA0 may be encoded with the two-byte sequence [0x81]: [0x20]. The integer value 0x60 may be encoded with the one-byte sequence [0x60]. The type of the IED may be indicated by the corresponding IEI.

Figure 11B:
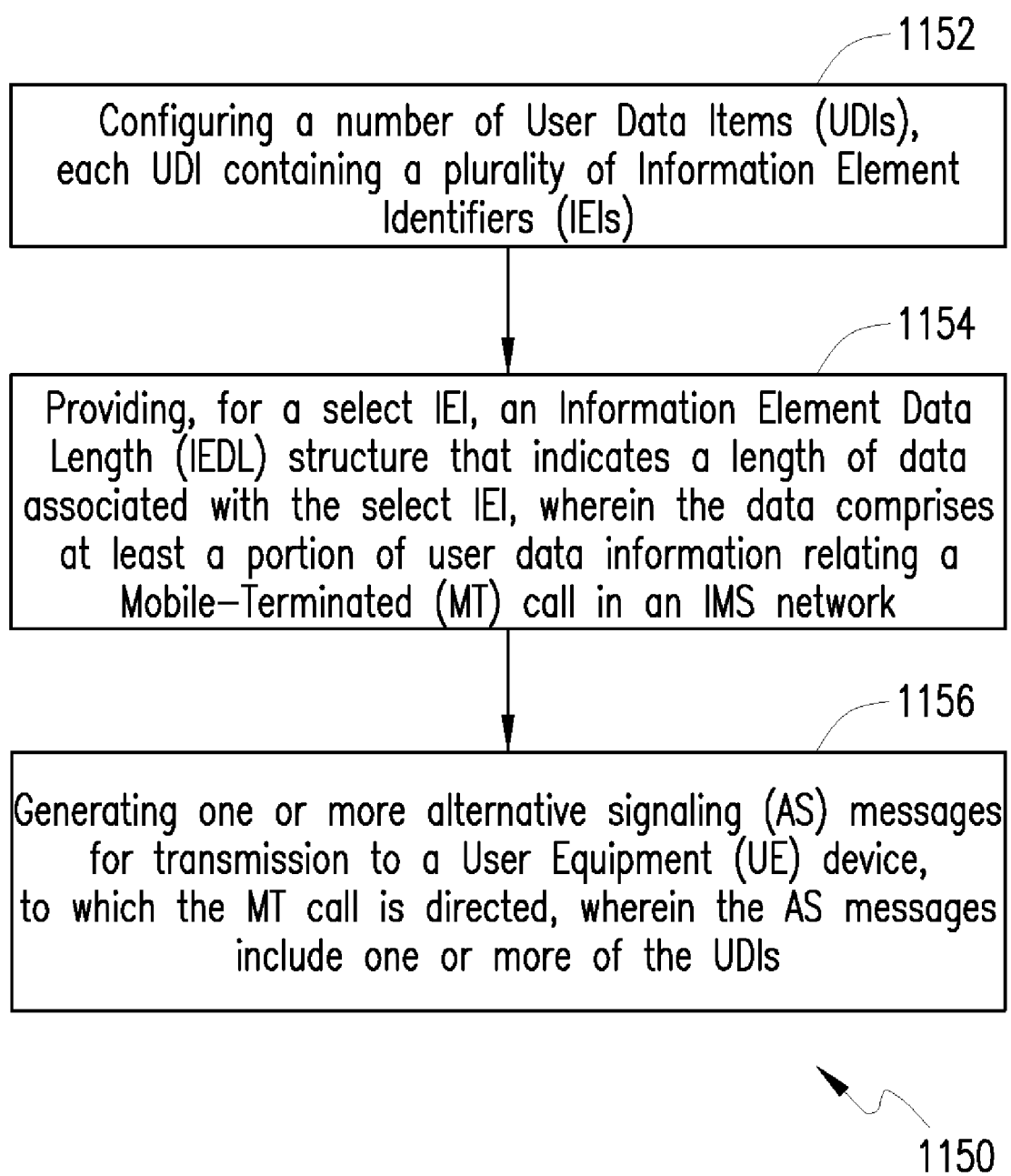
FIG. 11B depicts an embodiment of a message generation scheme that includes generating data structures of the type exemplified in FIGS. 10 and 11A for transporting user data information.

FIG. 11B depicts an embodiment of a message generation scheme 1150 that includes generating the data structures of FIG. 11A for transporting user data information, for example, between a UE device and an IMS-centric network node over a CS network, with respect to IMS message signaling. As set forth in this patent application, the IMS message signaling may pertain to delivering an MT call, although other IMS services may also use the message generation scheme. Accordingly, the scheme 1150 may be embodied as a method, system or a computer-accessible medium operable with respect to the user data information at a UE device or the network node. Furthermore, the UE device and the network node may be considered as a pair of entities, e.g., a first entity and a second entity, or vice versa, for purposes of generating and transmitting the messages from one entity to the other. In general, a number of UDIs may be configured or pre-configured at a first entity based on the amount of the user data information, wherein each UDI is operable to contain a plurality of IEIs (block 1152). For a select IEI, an IEDL structure is provided that is operable to indicate a length of data associated with the select IEI, wherein the data comprises at least a portion of the user data information (block 1154). As alluded to previously, depending on the IEI type, there may be some IEIs for which an IEDL is not necessary. One or more alternative signaling (AS) messages are generated for transmission to the other entity, i.e., the second entity, which could be the UE device or the network node, wherein the AS messages include one or more of the UDIs (block 1156). In relation to the ICS-NF node of 206 illustrated in FIG. 4, the foregoing scheme may be embodied or otherwise executed based on functionalities such as processor 402, ICS message application 418, message encode/decode block 408, dictionary 412, storage 420, among others.

A list of defined IEIs in the context of managing an MT-call, i.e., response and request encoding codes, may be provided as set forth in Tables 2A through 2K below, wherein a tabular structure can be thought of as being further separated in request/response IEIs and associated IEIs.

TABLE 2A

| IEI | Value | IEDL present | IED encoding |
|---|---|---|---|
| MT call setup | 0x01 | No | N.A. |
| Tel URI | 0x02 | No | See Tables 3A-3D Below |
| SIP(S) URI | 0x03 | Yes | See 3GPP TS 23.042 |
| A party withheld | 0x04 | No | N.A. |
| 100 (Trying) | N.A. | N.A. | N.A. |
| 1xx response | 0x05 | Yes | See 3GPP TS 23.042 |
| 180 (Ringing) | N.A. | N.A. | N.A. |
| 181 (Call Is Being Forwarded) | N.A. | N.A. | N.A. |
| 182 (Queued) | 0x06 | Yes | See 3GPP TS 23.042 |
| 183 (Session Progress) | 0x07 | Yes | See 3GPP TS 23.042 |
| 2xx response | 0x08 | Yes | See 3GPP TS 23.042 |
| 200 (OK) | 0x09 | No | N.A. |
| 202 (Accepted) | 0x0a | No | N.A. |
| 3xx response | 0x0b | No | N.A. |

TABLE 2B

| IEI | Value | IEDL present | IED encoding |
|---|---|---|---|
| 300 (Multiple Choices) | 0x0c | No | N.A. |
| 301 (Moved Permanently) | 0x0d | No | N.A. |
| 302 (Moved Temporarily) | 0x0e | No | N.A. |
| 305 (Use Proxy) | N.A. | N.A. | N.A. |
| 380 (Alternative Service) | 0x0f | No | N.A. |
| 4xx response | 0x10 | Yes | See 3GPP TS 23.042 |
| 400 (Bad Request) | 0x11 | No | N.A. |
| 401 (Unauthorized) | N.A. | N.A. | N.A. |
| 402 (Payment Required) | N.A. | N.A. | N.A. |
| 403 (Forbidden) | N.A. | N.A. | N.A. |
| 404 (Not Found) | N.A. | N.A. | N.A. |
| 405 (Method Not Allowed) | 0x12 | Yes | See 3GPP TS 23.042 |
| 406 (Not Acceptable) | N.A. | N.A. | N.A. |

TABLE 2C

| IEI | Value | IEDL present | IED encoding |
|---|---|---|---|
| 407 (Proxy Authentication Required) | N.A. | N.A. | N.A. |
| 408 (Request Timeout) | N.A. | N.A. | N.A. |
| 410 (Gone) | N.A. | N.A. | N.A. |
| 412 (Conditional Request Failed) | N.A. | N.A. | N.A. |
| 413 (Request Entity Too Large) | 0x13 | No | N.A. |
| 414 (Request-URI Too Large) | 0x14 | No | N.A. |
| 415 (Unsupported Media Type) | N.A. | N.A. | N.A. |
| 416 (Unsupported URI Scheme) | 0x15 | No | N.A. |
| 420 (Bad Extension) | 0x16 | No | N.A. |
| 421 (Extension Required) | 0x17 | No | N.A. |
| 422 (Session Interval Too Small) | 0x18 | No | N.A. |
| 423 (Interval Too Brief) | 0x19 | No | N.A. |

TABLE 2D

| IEI | Value | IEDL present | IED encoding |
|---|---|---|---|
| 424 (Bad Location Information) | N.A. | N.A. | N.A. |
| 429 (Provide Referrer Identity) | N.A. | N.A. | N.A. |
| 430 (Flow Failed) | N.A. | N.A. | N.A. |
| 433 (Anonymity Disallowed) | 0x1a | No | N.A. |
| 480 (Temporarily Unavailable) | 0x1b | No | N.A. |
| 481 (Call/Transaction Does Not Exist) | 0x1c | No | N.A. |
| 482 (Loop Detected) | N.A. | N.A. | N.A. |

TABLE 2D-continued

| IEI | Value | IEDL present | IED encoding |
|---|---|---|---|
| 483 (Too Many Hops) | N.A. | N.A. | N.A. |
| 484 (Address Incomplete) | N.A. | N.A. | N.A. |
| 485 (Ambiguous) | N.A. | N.A. | N.A. |
| 486 (Busy Here) | 0x1d | No | N.A. |

TABLE 2E

| IEI | Value | IEDL present | IED encoding |
|---|---|---|---|
| 487 (Request Terminated) | N.A. | N.A. | N.A. |
| 488 (Not Acceptable Here) | N.A. | N.A. | N.A. |
| 489 (Bad Event) | 0x1f | No | N.A. |
| 491 (Request Pending) | N.A. | N.A. | N.A. |
| 493 (Undecipherable) | 0x1f | No | N.A. |
| 494 (Security Agreement Required) | N.A. | N.A. | N.A. |
| 5xx response | 0x20 | Yes | See 3GPP TS 23.042 |
| 500 (Internal Server Error) | N.A. | N.A. | N.A. |
| 501 (Not Implemented) | N.A. | N.A. | N.A. |
| 502 (Bad Gateway) | N.A. | N.A. | N.A. |
| 503 (Service Unavailable) | N.A. | N.A. | N.A. |
| 504 (Server Time-out) | N.A. | N.A. | N.A. |
| 505 (Version not supported) | N.A. | N.A. | N.A. |

TABLE 2F

| IEI | Value | IEDL present | IED encoding |
|---|---|---|---|
| 513 (Message Too Large) | 0x21 | No | N.A. |
| 580 (Precondition Failure) | N.A. | N.A. | N.A. |
| 6xx response | 0x20 | Yes | See 3GPP TS 23.042 |
| 600 (Busy Everywhere) | 0x21 | No | N.A. |
| 603 (Decline) | 0x22 | No | N.A. |
| 604 (Does Not Exist Anywhere) | N.A. | N.A. | N.A. |
| 606 (Not Acceptable) | N.A. | N.A. | N.A. |
| Accept | N.A. | N.A. | N.A. |
| Accept-Contact | N.A. | N.A. | N.A. |
| Accept-Encoding | N.A. | N.A. | N.A. |
| Accept-Language | 0x23 | Yes | See 3GPP TS 23.042 |
| Alert-Info | 0x24 | Yes | See 3GPP TS 23.042 |

TABLE 2G

| IEI | Value | IEDL present | IED encoding |
|---|---|---|---|
| Allow | 0x25 | Yes | See 3GPP TS 23.042 |
| Allow-Events | 0x26 | Yes | See 3GPP TS 23.042 |
| Authorization | N.A. | N.A. | N.A. |
| Call-ID | 0x27 | Yes | See 3GPP TS 23.042 |
| Call-Info | 0x28 | Yes | See 3GPP TS 23.042 |
| Contact | 0x29 | Yes | See 3GPP TS 23.042 |
| Content-Disposition | 0x2a | Yes | See 3GPP TS 23.042 |
| Content-Encoding | 0x2b | Yes | See 3GPP TS 23.042 |

TABLE 2G-continued

| IEI | Value | IEDL present | IED encoding |
|---|---|---|---|
| Content-Language | 0x2c | Yes | See 3GPP TS 23.042 |
| Content-Length | N.A. | N.A. | N.A. |
| Content-Type | 0x2d | Yes | See 3GPP TS 23.042 |
| Cseq | 0x2e | Yes | See 3GPP TS 23.042 |
| Date | 0x2f | Yes | See 3GPP TS 23.042 |

TABLE 2H

| IEI | Value | IEDL present | IED encoding |
|---|---|---|---|
| Expires | 0x30 | Yes | See 3GPP TS 23.042 |
| From | 0x31 | Yes | See 3GPP TS 23.042 |
| Geolocation | 0x32 | Yes | See 3GPP TS 23.042 |
| History-Info | 0x33 | Yes | See 3GPP TS 23.042 |
| In-Reply-To | 0x34 | Yes | See 3GPP TS 23.042 |
| Join | 0x35 | Yes | See 3GPP TS 23.042 |
| Max-Forwards | N.A. | N.A. | N.A. |
| MIME-Version | N.A. | N.A. | N.A. |
| Min-SE | N.A. | N.A. | N.A. |
| Organization | 0x36 | Yes | See 3GPP TS 23.042 |
| P-Access-Network-Info | N.A. | N.A. | N.A. |
| P-Asserted-Identity | N.A. | N.A. | N.A. |

TABLE 2I

| IEI | Value | IEDL present | IED encoding |
|---|---|---|---|
| P-Called-Party-ID | N.A. | N.A. | N.A. |
| P-Charging-Function-Addresses | N.A. | N.A. | N.A. |
| P-Charging-Vector | N.A. | N.A. | N.A. |
| P-Media-Authorization | N.A. | N.A. | N.A. |
| P-Preferred-Identity | N.A. | N.A. | N.A. |
| P-Profile-Key | N.A. | N.A. | N.A. |
| P-User-Database | N.A. | N.A. | N.A. |
| P-Visited-Network-ID | N.A. | N.A. | N.A. |
| Priority | 0x37 | Yes | See 3GPP TS 23.042 |
| Privacy | 0x38 | Yes | See 3GPP TS 23.042 |
| Proxy-Authorization | N.A. | N.A. | N.A. |
| Proxy-Require | N.A. | N.A. | N.A. |
| Reason | 0x39 | Yes | See 3GPP TS 23.042 |
| Record-Route | N.A. | N.A. | N.A. |
| Referred-By | 0x40 | Yes | See 3GPP TS 23.042 |

TABLE 2J

| IEI | Value | IEDL present | IED encoding |
|---|---|---|---|
| Reject-Contact | 0x41 | Yes | See 3GPP TS 23.042 |
| Replaces | 0x42 | Yes | See 3GPP TS 23.042 |
| Reply-To | 0x43 | Yes | See 3GPP TS 23.042 |
| Request-Disposition | N.A. | N.A. | N.A. |
| Require | N.A. | N.A. | N.A. |
| Route | N.A. | N.A. | N.A. |
| Security-Client | N.A. | N.A. | N.A. |
| Security-Verify | N.A. | N.A. | N.A. |
| Session-Expires | N.A. | N.A. | N.A. |
| Subject | 0x44 | Yes | See 3GPP TS 23.042 |
| Supported | 0x45 | Yes | See 3GPP TS 23.042 |
| Timestamp | 0x46 | Yes | See 3GPP TS 23.042 |
| To | 0x47 | Yes | See 3GPP TS 23.042 |

TABLE 2K

| IEI | Value | IEDL present | IED encoding |
|---|---|---|---|
| User-Agent | N.A. | N.A. | N.A. |
| Via | N.A. | N.A. | N.A. |
| Server | 0x48 | Yes | See 3GPP TS 23.042 |
| Warning | N.A. | N.A. | N.A. |
| Rseq | 0x49 | no | mb_u_int32 |
| Authentication-Info | N.A. | N.A. | N.A. |
| Error-Info | 0x4a | Yes | See 3GPP TS 23.042 |
| Proxy-Authenticate | N.A. | N.A. | N.A. |
| WWW-Authenticate | N.A. | N.A. | N.A. |
| Retry-After | 0x4b | Yes | See 3GPP TS 23.042 |
| Unsupported | 0x4c | Yes | See 3GPP TS 23.042 |
| Security-Server | N.A. | N.A. | N.A. |
| Reason-Phrase | 0x4d | Yes | See 3GPP TS 23.042 |

Those skilled in the art will recognize that some IEIs may be followed by other IEIs, which can be either permissive or mandatory (e.g., IEI "182 (Queued)" may be followed by IEI "Reason-Phrase"). Accordingly, as alluded to previously, an appropriate encoder/decoder mechanism may be provided at the transmitter and recipient entities, which can be either a serving ICS node or a served ICS UE device. In conjunction, a suitable parser may also be provided at either or both entities. In one implementation, the functionality of a parser involves sequentially reading the USSD/SMS payload as set forth below:

I. Read a request/response IEI.

II. Find its associated IEIs if there are more UDIs. If there are no more UDIs, the parser may exit and any unexpected IEIs may be ignored. Applicable procedures of 3GPP TS 24.229 documentation may be used in conjunction with the Tables set forth above for possible headers encoded as associated IEIs.

III. Upon reading another response/request IEI, the parser may operate iteratively to proceed to Step (II) above.

By way of example, the coding of a Tel URI as an E.164 number may be provided in a variety of implementations, as set forth in the Tables 3A through 3D below.

TABLE 3A

| 8 | 7 | 6 | 5 | 4 | 3 | 2 | 1 | |
|---|---|---|---|---|---|---|---|---|
| | E.164 Information Element - X Party ID | | | | | | | octet 1 |
| | Length of called party BCD number contents | | | | | | | octet 2 |
| 1 ext | type of number | | | Numbering plan identification | | | | octet 2 |
| | Number digit 2 | | | Number digit 1 | | | | octet 3* |
| | Number digit 4 | | | Number digit 3 | | | | octet 4* |
| | | | | etc. | | | | . |

TABLE 3B

Type of number (octet 3)

| Bits | | | | |
|---|---|---|---|---|
| 7 | 6 | 5 | | |
| 0 | 0 | 0 | unknown | |
| 0 | 0 | 1 | international number | |
| 0 | 1 | 0 | national number | |
| 0 | 1 | 1 | network specific number | |
| 1 | 0 | 0 | dedicated access, short code | |
| 1 | 0 | 1 | reserved | |

TABLE 3B-continued

Type of number (octet 3)

| Bits | | | |
|---|---|---|---|
| 7 | 6 | 5 | |
| 1 | 1 | 0 | reserved |
| 1 | 1 | 1 | reserved for extension |

TABLE 3C

Numbering plan identification (octet 3)
Number plan (applies for type of number = 000,
001, 010 and 100)

| Bits | | | | |
|---|---|---|---|---|
| 4 | 3 | 2 | 1 | |
| 0 | 0 | 0 | 0 | unknown |
| 0 | 0 | 0 | 1 | ISDN/telephony numbering plan (Rec. E.164/E.163) |
| 0 | 0 | 1 | 1 | data numbering plan (Recommendation X.121) |
| 0 | 1 | 0 | 0 | telex numbering plan (Recommendation F.69) |
| 1 | 0 | 0 | 0 | national numbering plan |
| 1 | 0 | 0 | 1 | private numbering plan |
| 1 | 1 | 1 | 1 | reserved for extension |

All other values are reserved.

TABLE 3D

Number digits (octets 4, etc.)

| Bits | | | | | |
|---|---|---|---|---|---|
| 4 | 3 | 2 | 1 | or | |
| 8 | 7 | 6 | 5 | | Number digit value |
| 0 | 0 | 0 | 0 | | 0 |
| 0 | 0 | 0 | 1 | | 1 |
| 0 | 0 | 1 | 0 | | 2 |
| 0 | 0 | 1 | 1 | | 3 |
| 0 | 1 | 0 | 0 | | 4 |
| 0 | 1 | 0 | 1 | | 5 |
| 0 | 1 | 1 | 0 | | 6 |
| 0 | 1 | 1 | 1 | | 7 |
| 1 | 0 | 0 | 0 | | 8 |
| 1 | 0 | 0 | 1 | | 9 |
| 1 | 0 | 1 | 0 | | * |
| 1 | 0 | 1 | 1 | | # |
| 1 | 1 | 0 | 0 | | a |
| 1 | 1 | 0 | 1 | | b |
| 1 | 1 | 1 | 0 | | c |
| 1 | 1 | 1 | 1 | | used as an endmark in the case of an odd number of number digits |

By way of further example, the coding of a SIP URI and the payload (e.g., USSD or SMS) may be provided as follows. In one embodiment, the SIP URI or the payload may be compressed using one or more standard compression algorithms in accordance with 3GPP TS 23.042 documentation. For optimal and efficient transmission and/or compression, compatible dictionaries may be provided at the both ends, as alluded to previously. A dictionary may be embodied as a list of key words or phrases of up to certain length (e.g., 255 characters) that are known to both the coder and decoder. The input stream may be matched against entries provided in the dictionary and matching characters in the stream may be replaced with a reference to the dictionary entry. Operationally, such dictionaries may be provisioned by a network operator and may include matches for frequently occurring strings (or strings that occur a certain number of times) such as, e.g., "sip:", "sips:" and the domain fragment of a URI, as well as other frequently occurring strings or string fragments.

Figure 12:
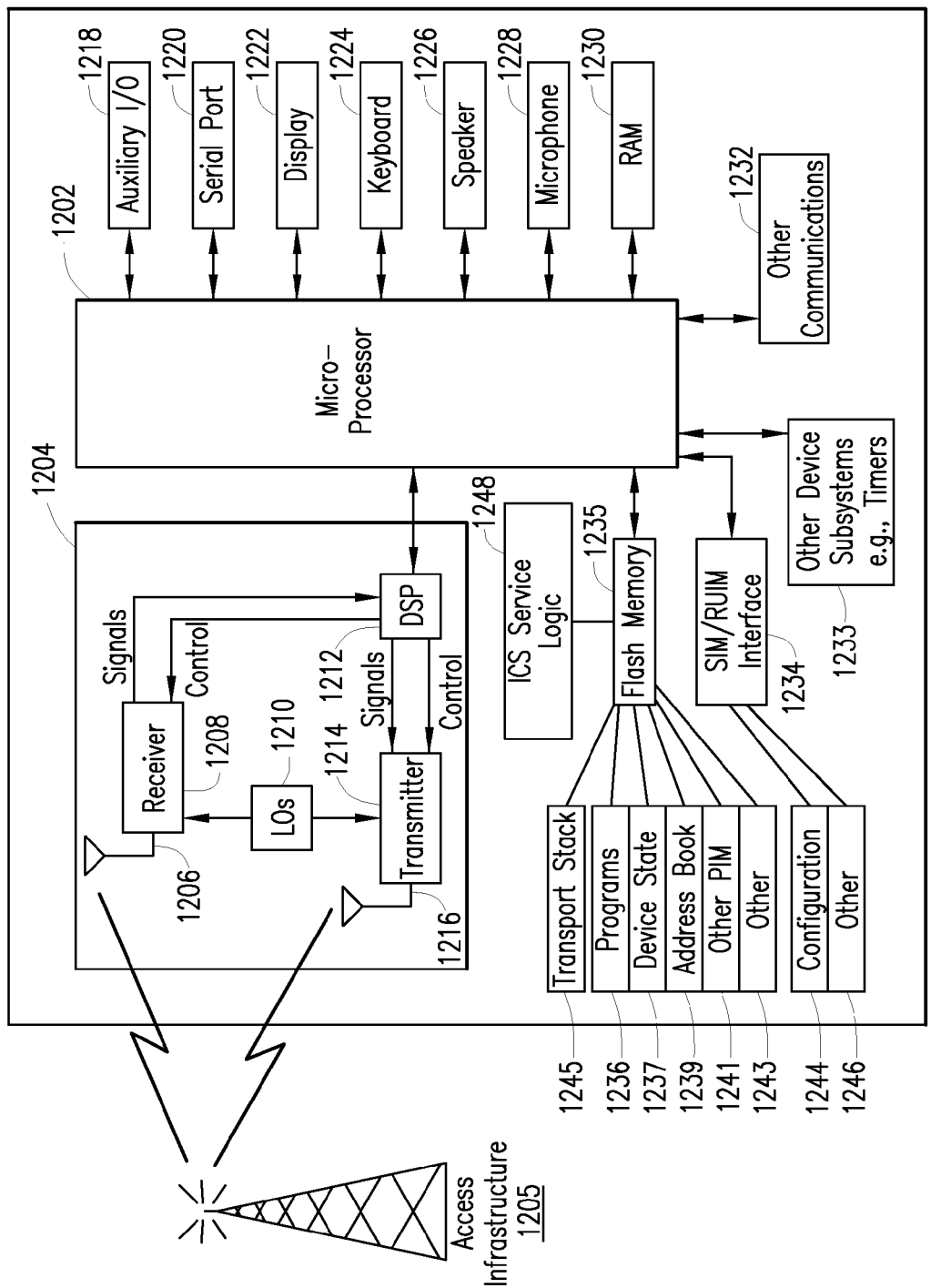
FIG. 12 is a block diagram that depicts additional details of an embodiment of a communications device operable for purposes of the present patent disclosure.

FIG. 12 depicts a block diagram of an embodiment of a communications device operable as an ICS UE device, e.g., UE 202, for purposes of the present patent disclosure. It will be recognized by those skilled in the art upon reference hereto that although an embodiment of UE 202 may comprise an arrangement similar to one shown in FIG. 12, there can be a number of variations and modifications, in hardware, software or firmware, with respect to the various modules depicted. Accordingly, the arrangement of FIG. 12 should be taken as illustrative rather than limiting with respect to the embodiments of the present patent disclosure. A microprocessor 1202 providing for the overall control of an embodiment of UE 202 is operably coupled to a communication subsystem 1204 that may be capable of multi-mode communications (e.g., CS domain, IP domain such as IMS, et cetera). The communication subsystem 1204 generally includes one or more receivers 1208 and one or more transmitters 1214 as well as associated components such as one or more local oscillator (LO) modules 1210 and a processing module such as a digital signal processor (DSP) 1212. As will be apparent to those skilled in the field of communications, the particular design of the communication module 1204 may be dependent upon the communications networks with which the mobile device is intended to operate (e.g., a CDMA network, a GSM network, WLAN, et cetera). Regardless of the particular design, however, signals received by antenna 1206 through appropriate access infrastructure 1205 (e.g., cellular base station towers, WLAN hot spots, etc.) are provided to receiver 1208, which may perform such common receiver functions as signal amplification, frequency down conversion, filtering, channel selection, analog-to-digital (A/D) conversion, and the like. Similarly, signals to be transmitted are processed, including modulation and encoding, for example, by DSP 1212, and provided to transmitter 1214 for digital-to-analog (D/A) conversion, frequency up conversion, filtering, amplification and transmission over the air-radio interface via antenna 1216.

Microprocessor 1202 may also interface with further device subsystems such as auxiliary input/output (I/O) 1218, serial port 1220, display 1222, keyboard/keypad 1224, speaker 1226, microphone 1228, random access memory (RAM) 1230, a short-range communications subsystem 1232, and any other device subsystems, e.g., timer mechanisms, generally labeled as reference numeral 1233. To control access, an interface 1234 may also be provided in communication with the microprocessor 1202 with respect to a removable storage module (Universal/Subscriber Identity Module (U/SIM) or Removable User Identity Module (RUIM)). In one implementation, U/SIM or RUIM interface 1234 may be operable with a U/SIM or RUIM card having a number of key configurations 1244 and other information 1246 such as R-URIs as well as identification and subscriber-related data.

Operating system software and applicable service logic software may be embodied in a persistent storage module (i.e., non-volatile storage) such as Flash memory 1235. In one implementation, Flash memory 1235 may be segregated into different areas, e.g., storage area for computer programs 1236 (e.g., service processing logic), as well as data storage regions such as device state 1237, address book 1239, other personal information manager (PIM) data 1241, and other data storage areas generally labeled as reference numeral 1243. A transport stack 1245 may be provided to effectuate one or more appropriate radio-packet transport protocols. In addition, an ICS service logic module 1248 is provided for effectuating reception/generation of ICCP-based alternative signaling (i.e., USSD/SMS) as well as mechanisms to effectuate MO call procedures based on received IMRNs from an ICS network node, etc., as set forth hereinabove.

It should be appreciated that the various operations, components and processes set forth in the present patent disclosure, operable either at the ICS UE device, the ICS network node, or at other network locations, may be accomplished via a number of means, including software (e.g., program code or sequence of instructions), firmware, hardware, or in any combination, usually in association with a processing system. Where the processes are embodied in software, such software may comprise program instructions that form a computer program product, instructions on computer-accessible media, uploadable service application software, or software downloadable from a remote station, and the like. Further, where the processes, data structures, or both, are stored in computer-accessible storage, such storage may include semiconductor memory, internal and external computer storage media and encompasses, but not limited to, nonvolatile media, volatile media, and transmission media. Nonvolatile media may include CD-ROMs, magnetic tapes, PROMs, Flash memory, or optical media. Volatile media may include dynamic memory, caches, RAMs, etc. Transmission media may include carrier waves or other signal-bearing media. As used herein, the phrase "computer-accessible medium" encompasses "computer-readable medium" as well as "computer-executable medium."

It is believed that the operation and construction of the embodiments of the present patent application will be apparent from the Detailed Description set forth above. While the exemplary embodiments shown and described may have been characterized as being preferred, it should be readily understood that various changes and modifications could be made therein without departing from the scope of the present disclosure as set forth in the following claims.

What is claimed is:

1. A method for a Mobile-Terminated (MT) call in an Internet Protocol (IP) Multimedia Subsystem (IMS) network, said MT call being originated by a calling party towards a User Equipment (UE) device, comprising:
   receiving a message for said MT call at a network node and determining that said MT call is to be delivered to said UE device over a Circuit-Switched (CS) domain;
   storing call information relating to said MT call and associating an IP Multimedia Routing Number (IMRN) with at least a portion of said call information in a mapping relationship;
   transmitting an incoming call request message using a USSD message to said UE device, wherein the incoming call request includes said IMRN, an A-party ID of the calling party and an indication that said USSD message is for delivery of said MT call;
   receiving said IMRN back from said UE device pursuant to a Mobile-Originated (MO) CS call terminating at said network node, wherein said IMRN is used as a destination number; and
   upon verifying that said IMRN is valid, sending a response message towards the calling party and sending a response to effectuate an end-to-end path for said MT call between said calling party and said UE device.

2. The method for an MT call in an IMS network as recited in claim 1, wherein said message comprises a Session Initiation Protocol (SIP) INVITE method request.

3. The method for an MT call in an IMS network as recited in claim 1, wherein said IMRN is an E.164 number that is one of selected from a pool of E.164 numbers and dynamically generated.

4. The method for an MT call in an IMS network as recited in claim 1, wherein said IMRN is verified to be a valid number by monitoring that said IMRN has not timed out.

5. The method for an MT call in an IMS network as recited in claim 4, further comprising releasing said IMRN to a quarantine pool for a time period.

6. The method for an MT call in an IMS network as recited in claim 1, wherein said IMRN is received at said IMS network node via a SIP INVITE method request from a Media Gateway Control Function (MGCF) entity.

7. The method for an MT call in an IMS network as recited in claim 6, wherein said SIP INVITE method request comprises a Network-Access-Info Header field.

8. The method for an MT call in an IMS network as recited in claim 1, wherein said USSD message contains information relating to a B-Party ID.

9. The method for an MT call in an IMS network as recited in claim 8, wherein said USSD message further contains information relating to a Privacy ID setting associated with said A-Party ID.

10. The method for an MT call in an IMS network as recited in claim 8, wherein at least one of said A-Party ID and said B-Party ID is encoded via a dictionary mechanism.

11. The method for an MT call in an IMS network as recited in claim 10, wherein said dictionary mechanism comprises matching a character string that occurs a predetermined number of times.

12. The method for an MT call in an IMS network as recited in claim 11, wherein said character string comprises at least one of a "sip:" and "sips:".

13. The method for an MT call in an IMS network as recited in claim 10, wherein said dictionary mechanism comprises matching a domain fragment of a Uniform Resource Identifier (URI).

14. The method for an MT call in an IMS network as recited in claim 8, wherein at least one of said A-Party ID and said B-Party ID is encoded as at least one of a SIP URI, a TEL URI, and an E.164 number.

15. A network node operable to manage a Mobile-Terminated (MT) call in an Internet Protocol (IP) Multimedia Subsystem (IMS), said MT call being originated by a calling party towards a User Equipment (UE) device, comprising:
   a component configured to receive a message for said MT call and to determine that said MT call is to be delivered to said UE device over a Circuit-Switched (CS) domain;
   a component configured to store call information relating to said MT call and to associate an IP Multimedia Routing Number (IMRN) with at least a portion of said call information in a mapping relationship;
   a component configured to transmit an incoming call request message using a USSD message to said UE device, wherein the incoming call request message includes said IMRN, an A-party ID of the calling party and an indication that said USSD message is for delivery of said MT call;
   a component configured to receive said IMRN back from said UE device pursuant to a Mobile-Originated (MO) CS call terminating at said network node, wherein said IMRN is used as a destination number; and
   a component, operable responsive to verifying that said IMRN is valid, configured to send a response message towards the calling party and to send a response to effectuate an end-to-end path for said MT call between said calling party and said UE device.

16. The network node operable to manage an MT call as recited in claim 15, wherein said component configured to receive a message comprises a component configured to receive a Session Initiation Protocol (SIP) INVITE method request.

17. The network node operable to manage an MT call as recited in claim 15, further comprising a component configured to provision a range of IMRNs from which said IMRN is assigned.

18. The network node operable to manage an MT call as recited in claim 15, further comprising a component configured to generate said IMRN.

19. The network node operable to manage an MT call as recited in claim 15, further comprising a component configured to verify that said IMRN is valid.

20. The network node operable to manage an MT call as recited in claim 15, further comprising a component configured to encode said call information for transmission via said USSD message.

21. The network node operable to manage an MT call as recited in claim 20, wherein said component configured to encode said call information comprises a dictionary mechanism.

22. The network node operable to manage an MT call as recited in claim 21, wherein said dictionary mechanism comprises a component configured to match a character string that occurs a predetermined number of times.

23. The network node operable to manage an MT call as recited in claim 22, wherein said character string comprises at least one of a "sip:" and "sips:".

24. The network node operable to manage an MT call as recited in claim 21, wherein said dictionary mechanism comprises a component configured to match a domain fragment of a Uniform Resource Identifier (URI).

25. A computer-accessible non-transitory medium having a sequence of instructions executable by a processing entity of a network node operable for a Mobile-Terminated (MT) call in an Internet Protocol (IP) Multimedia Subsystem (IMS), said medium comprising:

instructions for storing call information relating to said MT call received via a message for said MT call from a calling party and for determining that said MT call is to be delivered to a User Equipment (UE) device over a Circuit-Switched (CS) domain;

instructions for associating an IP Multimedia Routing Number (IMRN) with at least a portion of said call information in a mapping relationship;

instructions for encoding an incoming call request message in a USSD message for transmission to said UE device, wherein said incoming call request message includes said IMRN, an A-party ID of the calling party and an indication that said USSD message is for delivery of said MT call;

instructions for verifying that said IMRN is valid when said IMRN is received back from said UE device pursuant to a Mobile-Originated (MO) CS call wherein said IMRN is used as a destination number; and instructions for sending a response message towards the calling party and sending a response to effectuate an end-to-end path for said MT call between said calling party and said UE device.

* * * * *

UNITED STATES PATENT AND TRADEMARK OFFICE
CERTIFICATE OF CORRECTION

| | | |
|---|---|---|
| PATENT NO. | : 8,160,559 B2 | Page 1 of 1 |
| APPLICATION NO. | : 12/126974 | |
| DATED | : April 17, 2012 | |
| INVENTOR(S) | : Adrian Buckley et al. | |

It is certified that error appears in the above-identified patent and that said Letters Patent is hereby corrected as shown below:

Column 4,
Line 35, "DSEL" should read --DSL--.

Column 13,
Line 38, "QRUU" should read --GRUU--.

Column 17,
Line 32, "UDIS" should read --UDIs--.

Signed and Sealed this
Tenth Day of July, 2012

David J. Kappos
*Director of the United States Patent and Trademark Office*